US006028155A

United States Patent [19]
Collins et al.

[11] Patent Number: 6,028,155
[45] Date of Patent: Feb. 22, 2000

[54] SURFACTANT-CONTAINING ACETOACETOXY-FUNCTIONAL AND ENAMINE-FUNCTIONAL POLYMERS

[75] Inventors: Martha Jean Collins, Blountville; James Wayne Taylor, Kingsport, both of Tenn.

[73] Assignee: Eastman Chemical Company, Kingsport, Tenn.

[21] Appl. No.: 08/861,433

[22] Filed: May 21, 1997

Related U.S. Application Data

[60] Provisional application No. 60/018,423, May 28, 1996, provisional application No. 60/018,424, May 28, 1996, and provisional application No. 60/028,444, Oct. 10, 1996.

[51] Int. Cl.[7] .................... C08F 228/00; C08F 224/00
[52] U.S. Cl. ........................ 526/270; 526/273; 526/287
[58] Field of Search ................................. 526/270, 273, 526/286, 287, 307.1, 302, 304

[56] References Cited

U.S. PATENT DOCUMENTS

| | | | |
|---|---|---|---|
| 3,113,038 | 12/1963 | Lattarulo et al. | |
| 3,261,797 | 7/1966 | McDowell et al. | |
| 3,290,417 | 12/1966 | Christenson et al. | |
| 3,325,443 | 6/1967 | Christenson et al. | |
| 3,356,627 | 12/1967 | Scott | |
| 3,386,939 | 6/1968 | Mesee et al. | |
| 3,483,149 | 12/1969 | Gresenz et al. | |
| 3,553,116 | 1/1971 | Kaplan et al. | |
| 3,607,834 | 9/1971 | Marx et al. | |
| 3,639,327 | 2/1972 | Drelich | |
| 3,678,013 | 7/1972 | Sherwood et al. | |
| 3,679,564 | 7/1972 | Dowbenko et al. | |
| 3,725,124 | 4/1973 | Gorton et al. | |
| 3,927,206 | 12/1975 | Blank et al. | 424/81 |
| 4,136,067 | 1/1979 | Reed et al. | 521/32 |
| 4,158,725 | 6/1979 | Nishimura et al. | |
| 4,210,565 | 7/1980 | Emmons et al. | |
| 4,239,893 | 12/1980 | Pigerol et al. | 546/321 |
| 4,241,682 | 12/1980 | Kondstandt | |
| 4,244,850 | 1/1981 | Mylonakis | |
| 4,535,128 | 8/1985 | Umemoto et al. | 525/162 |
| 4,812,541 | 3/1989 | Mallya et al. | 526/264 |
| 4,820,863 | 4/1989 | Taylor | |
| 4,855,349 | 8/1989 | Ingle | 524/432 |
| 4,906,684 | 3/1990 | Say | 524/548 |
| 4,908,229 | 3/1990 | Kissel | 427/54.1 |
| 4,908,403 | 3/1990 | Spada et al. | 524/818 |
| 4,987,186 | 1/1991 | Akiyama et al. | 525/107 |
| 5,002,998 | 3/1991 | Carey et al. | 524/555 |
| 5,021,469 | 6/1991 | Langerbeins et al. | 523/201 |
| 5,053,441 | 10/1991 | Biale | 523/201 |
| 5,055,506 | 10/1991 | Knutson | 524/100 |
| 5,073,445 | 12/1991 | Ingle | 428/314.4 |
| 5,100,969 | 3/1992 | Yamamoto et al. | 525/327.3 |
| 5,108,575 | 4/1992 | Chung et al. | 204/181.7 |
| 5,185,397 | 2/1993 | Biale | 524/820 |
| 5,202,375 | 4/1993 | Biale | 524/562 |
| 5,227,413 | 7/1993 | Mitra | 523/116 |
| 5,242,978 | 9/1993 | Muller et al. | 525/102 |
| 5,244,963 | 9/1993 | Biale | 524/555 |
| 5,246,984 | 9/1993 | Darwen et al. | 523/404 |
| 5,247,040 | 9/1993 | Amick et al. | 526/286 |

(List continued on next page.)

FOREIGN PATENT DOCUMENTS

| | | |
|---|---|---|
| 341886 | 11/1989 | European Pat. Off. |
| 358358 | 3/1990 | European Pat. Off. |
| 390370 | 10/1990 | European Pat. Off. |
| 483915 | 5/1992 | European Pat. Off. |
| 0 552 469 A2 | 7/1993 | European Pat. Off. |
| 555774 | 8/1993 | European Pat. Off. |
| 705855 | 4/1996 | European Pat. Off. |
| 2535372 | 2/1977 | Germany |
| 3713511 | 12/1987 | Germany |
| 61-21171 | 1/1986 | Japan |
| 1-229242 | 9/1989 | Japan |
| 3-6236 | 1/1991 | Japan |
| 4-189874 | 7/1992 | Japan |
| 1151479 | 5/1969 | United Kingdom |
| WO 91/14715 | 10/1991 | WIPO |
| WO 95/00573 | 1/1995 | WIPO |
| WO95/09209 | 4/1995 | WIPO |
| WO 96/16998 | 6/1996 | WIPO |
| WO 96/32424 A2 | 10/1996 | WIPO |

OTHER PUBLICATIONS

Geurink et al, "Analytical aspects and film properties of two–pack acetoacetate functional laxtexes," *Progress in Organic Coatings*, vol. 27, Jan.–Apr. 1996, pp. 73–78.

D. Horn, "Polyethylenimine–Physicoochemical Properties and Applications" 1980.

Nishihata et al., "Formation and Hydrolysis of Enamine in Aqueous Solution" Chem. Pharm. Bull., Jan. 26, 1984.

Rector et al., "Applications for the Acetoacetyl Functionality in Thermoset Coatings" Feb. 3, 1988.

Lee et al., "Effects of Surfactants and Polymerization Methods on the Morphology of Particles Formed in 'Core–Shell' Emulsion Polymerization of Methyl Methacrylate and Styrene" Makromol. Chem., Sep. 8, 1989.

"For Your Unlimited Imagination: Polymin (Polyethylenimine)" 1992 BASF Corporation.

(List continued on next page.)

*Primary Examiner*—Christopher Henderson
*Attorney, Agent, or Firm*—Rose M. Allen; Harry J. Gwinnell

[57] ABSTRACT

Surfactant-containing acetoacetoxy-functional polymers (SAAP's) are described. The acetoacetoxy-functional polymer may be a surfactant-containing enamine-functional polymer and more preferably a surfactant-containing, polymeric (polyamino)enamine (PPAE). The PPAE is the reaction product of a surfactant-containing acetoacetoxy-functional polymer (SAAP) and a poly(alkylenimine). The polymers may be prepared as waterborne polymer compositions, such as latexes. The waterborne polymer compositions can be prepared with high solids content while maintaining low viscosity. Waterborne polymer compositions containing the polymers of the inventions are useful in a variety of coating formulations such as, for example, paints, inks, sealants, and adhesives. When used in coating formulations, the polymers of the invention provide adhesion and crosslinking in the final film or coating. The film or coating may be cured at ambient temperatures or may be thermally cured.

5 Claims, No Drawings

U.S. PATENT DOCUMENTS

| | | | |
|---|---|---|---|
| 5,270,380 | 12/1993 | Adamson et al. | 524/556 |
| 5,277,978 | 1/1994 | Feustel et al. | 428/402 |
| 5,296,530 | 3/1994 | Bors et al. | 524/558 |
| 5,308,890 | 5/1994 | Snyder | 523/201 |
| 5,344,675 | 9/1994 | Snyder | 427/388.4 |
| 5,349,026 | 9/1994 | Emmons et al. | 525/328.6 |
| 5,362,816 | 11/1994 | Snyder et al. | 525/329.9 |
| 5,364,891 | 11/1994 | Pears et al. | 522/149 |
| 5,371,148 | 12/1994 | Taylor et al. | 525/293 |
| 5,391,624 | 2/1995 | Rasoul et al. | 525/216 |
| 5,414,041 | 5/1995 | Larson et al. | 524/589 |
| 5,426,129 | 6/1995 | Emmons et al. | 522/6 |
| 5,484,849 | 1/1996 | Bors et al. | 525/167.5 |
| 5,494,961 | 2/1996 | Lavoie et al. | 525/102 |
| 5,494,975 | 2/1996 | Lavoie et al. | 525/928.6 |
| 5,498,659 | 3/1996 | Esser | 524/549 |
| 5,525,662 | 6/1996 | Lavoie et al. | 524/558 |
| 5,534,310 | 7/1996 | Rokowski et al. | 427/494 |
| 5,541,251 | 7/1996 | Bontinck et al. | 524/507 |
| 5,548,024 | 8/1996 | Lavoie et al. | 525/102 |
| 5,559,192 | 9/1996 | Bors et al. | 525/300 |
| 5,562,953 | 10/1996 | Bors et al. | 427/558 |
| 5,605,722 | 2/1997 | Esser | 427/388.4 |
| 5,605,952 | 2/1997 | Esser | 524/522 |
| 5,605,953 | 2/1997 | Esser | 524/522 |
| 5,609,965 | 3/1997 | Esser | 428/522 |
| 5,616,764 | 4/1997 | Lavoie et al. | 556/482 |
| 5,672,379 | 9/1997 | Schall et al. | 427/137 |
| 5,763,546 | 6/1998 | Jung et al. | 525/313 |
| 5,767,199 | 6/1998 | Bors et al. | 525/153 |

OTHER PUBLICATIONS

Moszner et al. "Reaction behaviour of monomeric β–ketoesters" Polymer Bulletin, 1994.

Keith M. Moody, "Waterborne Acrylic Emulsion Using AAEM" Technical Tips, Eastman Kodak Company Sep. 1, 1995.

Derwent Abstract of JP60127376, Jul. 8, 1995.

Derwent Abstract of JP3020302, Jan. 29, 1991.

SURFACTANT-CONTAINING ACETOACETOXY-FUNCTIONAL AND ENAMINE-FUNCTIONAL POLYMERS

This application claims priority to U.S. Provisional Application Ser. No. 60/018,423, filed May 28, 1996; Ser. No. 60/018,424 filed May 28, 1996; and Ser. No. 60/028,444 filed Oct. 10, 1996.

FIELD OF THE INVENTION

This invention belongs to the field of emulsion chemistry. In particular, it relates to acetoacetoxy-functional polymers which are useful in a variety of coating formulations.

BACKGROUND OF THE INVENTION

In an increasing number of industries, aqueous coating compositions continue to replace traditional organic solvent-based coating compositions. Paints, inks, sealants, and adhesives, for example, previously formulated with organic solvents are now formulated as aqueous compositions. This reduces potentially harmful exposure to volatile organic compounds (VOC's) commonly found in solvent-based compositions. While the move from organic solvent-based to aqueous compositions brings health and safety benefits, the aqueous coating compositions must meet or exceed the performance standards expected from solvent-based compositions. The need to meet or exceed such performance standards places a premium on the characteristics and properties of waterborne polymer compositions used in aqueous coating compositions.

Waterborne polymer having various functional groups have been used to impart and achieve desired properties to a particular coating composition. For example, a coating composition should exhibit good film formation, print and block resistance, as well as adhesion and tensile properties. Polymers having acetoacetoxy- and enamine-functional groups represent one example of waterborne polymers which have such properties, may carry different functional groups, and are useful in aqueous coating compositions.

U.S. Pat. No. 5,296,530 discloses a quick-curing coating prepared from a polymer having acetoacetyl groups, in which substantially all of the acetoacetyl groups have been converted to enamine functional groups. This conversion occurs, for example, by treatment with ammonia or a primary amine. Coatings so prepared cure more quickly under sunlight or ultraviolet light than coatings which contain the acetoacetyl functional polymer but which have not been converted to an enamine form.

U.S. Pat. Nos. 5,484,975 and 5,525,662 describe the preparation of polymers containing functional acetoacetate groups and then, following the polymerization, reacting the acetoacetate group with a functional amine to form an enamine. The resulting polymers are reported to have a variety of uses including coatings, sealants, adhesives, and saturant applications.

U.S. Pat. No. 5,498,659 discloses polymeric formulations comprising an aqueous carrier, at least one polymeric ingredient, a non-polymeric polyfunctional amine, and a base. The polymeric ingredient has both acid-functional and acetoacetoxy-type functional moieties. The aqueous polymeric formulations produce crosslinked polymeric surface coatings on a substrate.

Japanese Patent 61-21171 describes a fast-curing adhesive consisting of two separate liquids. The first liquid is an aqueous solution and/or aqueous emulsion of a polymer compound containing an acetoacetyl group. The second liquid consists of polyethylenimine.

Even with current waterborne polymer formulations, a need remains for improved aqueous coating compositions and waterborne polymers for use in those compositions. In particular, a need exists for waterborne polymer compositions which may formulated as a single, stable composition but which undergo crosslinking upon film formation imparting one or more desired properties to the resulting coating. The present invention meets such needs.

SUMMARY OF THE INVENTION

This invention provides a surfactant-containing acetoacetoxy-functional polymer (SAAP). In a preferred embodiment, the acetoacetoxy-functional polymer is a surfactant-containing enamine-functional polymer and more preferably a surfactant-containing, polymeric (polyamino) enamine (PPAE). The PPAE is the reaction product of a surfactant-containing acetoacetoxy-functional polymer (SAAP) and a poly(alkylenimine). The polymers of the invention may be prepared as waterborne polymer compositions, such as latexes. The waterborne polymer compositions can be prepared with high solids content while maintaining low viscosity. Waterborne polymer compositions containing the polymers of the invention are useful in a variety of coating formulations such as, for example, paints, inks, sealants, and adhesives. When used in coating formulations, the polymers of the invention provide adhesion and crosslinking in the final film or coating. The film or coating may be cured at ambient temperatures or may be thermally cured.

BRIEF DESCRIPTION OF THE DRAWINGS

FIG. 1 depicts the affect of polymer particle size and percent solids on the viscosity of a latex of the invention.

DETAILED DESCRIPTION OF THE INVENTION

The present invention provides polymers which may be used in a waterborne polymer composition, that is a composition containing a polymer and water. Waterborne polymer compositions include, but are not limited to, latexes, dispersions, microemulsions, or suspensions. Waterborne polymer compositions are stable when stored at room temperature or moderately above room temperature (e.g., about 50 to 60° C.) and provide adhesion and crosslinking upon film formation when applied to a substrate. Yet, a film or coating formed with polymers of the invention may be cured at room temperature (ambient cure) or at elevated temperatures (thermal cure).

The polymers of the invention are generally prepared as particles, particularly in a waterborne composition. The particles may be structured or unstructured. Structured particles include, but are not limited to, core/shell particles and gradient particles. The average polymer particle size may range from about 25 to about 500 nm. Preferred average polymer particle sizes for small particles range from about 25 to about 100 nm and more preferably from about 45 to about 80 nm. For large particles, preferred average polymer particle sizes range from about 110 to about 450 nm.

The polymer particles generally have a spherical shape. In one embodiment, the generally spherical polymeric particle may have a core portion and a shell portion. The core/shell polymer particles may also be prepared in a multilobe form, a peanut shell form, an acorn form, or a raspberry form. It is further preferred in such particles that the core portion comprises about 20 to about 80% of the total weight of said particle and the shell portion comprises about 80 to about 20% of the total weight of the particle.

Reacting a surfactant-containing acetoacetoxy-functional polymer (SAAP) with ammonia, a primary or secondary amine yields a surfactant-containing enamine-functional polymer of the invention. A polymeric (polyamino)enamine (PPAE) results from the reaction of a SAAP with a poly (alkylenimine). Polymeric (polyamino)enamines represent a particularly preferred group of amino-functional polymers for use in a waterborne polymer composition according to the invention. These various polymers according to the invention, their preparation, and the related preferred embodiments are discussed below.

The SAAP may be prepared by free radical emulsion polymerization of a non-acid vinyl monomer having an acetoacetoxy functionality such as those of Formula (1) below with at least one non-self-polymerizing, surface-active vinyl monomer and other non-acid vinyl monomers. This affords water-based dispersion of surfactant-containing polymer particles with the polymer having pendant acetoacetoxy groups. As used here, a non-acid vinyl monomer is an ethylenically-unsaturated, non-carboxylic acid-containing monomer. A pendant acetoacetoxy group is not strictly limited to those at the termini of the polymer. Pendant acetoacetoxy groups also include groups attached to the polymer's backbone and available for further reaction.

The SAAP preferably contains about 1 to about 40 weight percent acetoacetoxy-functional monomers such as those of Formula (1) below, about 0.05 to about 20 weight percent of at least one non-self-polymerizing, surface-active vinyl monomer and about 60 to about 90 weight percent of other non-acid vinyl monomers. The weight percentage is based on the total amount of monomer. More preferably, the SAAP has about 10 to about 25 weight percent acetoacetoxy monomers, about 0.1 to about 10 weight percent of at least one non-self-polymerizing, surface-active vinyl monomer and about 75 to about 90 weight percent of other vinyl monomers.

The water-based emulsion polymerization to prepare the SAAP preferably occurs in the presence of a nonionic surfactant and an anionic surfactant. The nonionic surfactant may be present in amounts ranging from about 0.25 to about 5 phr, and the anionic surfactant in amounts ranging from about 0.1 to 1 phr. The unit "phr" defines the grams dry weight of the recited component, for example the surfactant, per 100 grams dry weight of the resin, where the "resin" includes all polymerization components excluding water. Aspects of this emulsion polymerization and preferred embodiments are discussed below.

Any non-acid vinyl monomer having acetoacetoxy-type functionality may be used to prepare a polymer of the invention. Of such monomers, preferred monomers are those of Formula (1).

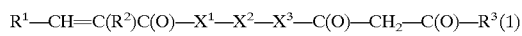

$R^1$—CH=C($R^2$)C(O)—$X^1$—$X^2$—$X^3$—C(O)—CH$_2$—C(O)—$R^3$ (1)

For an acetoacetoxy-type monomer of Formula (1), $R^1$ is a hydrogen or halogen. $R^2$ is a hydrogen, halogen, $C_1$–$C_6$ alkylthio group, or $C_1$–$C_6$ alkyl group. $R^3$ is a $C_1$–$C_6$ alkyl group. $X^1$ and $X^3$ are independently O, S, or a group of the formula —N(R')—, where R' is a $C_1$–$C_6$ alkyl group. $X^2$ is a $C_2$–$C_{12}$ alkylene group or $C_3$–$C_{12}$ cycloalkylene group. The alkyl and alkylene groups described here and throughout the specification may be straight or branched groups. Preferred monomers of Formula (1) are acetoacetoxyethyl methacrylate, acetoacetoxyethyl acrylate, acetoacetoxy (methyl)ethyl acrylate, acetoacetoxypropyl acrylate, allyl acetoacetate, acetoacetamidoethyl (meth)acrylate, and acetoacetoxybutyl acrylate. Acetoacetoxyethyl methacrylate (AAEM) represents a particularly preferred monomer of Formula (1).

Suitable non-acid vinyl monomers which may be used, for example, include, but are not limited to, methyl acrylate; methyl methacrylate; ethyl acrylate; ethyl methacrylate; butyl acrylate; butyl methacrylate; isobutyl acrylate; isobutyl methacrylate; ethylhexyl acrylate; 2-ethylhexyl methacrylate; octyl acrylate; octyl methacrylate; iso-octyl acrylate; iso-octyl methacrylate; trimethylolpropyl triacrylate; styrene; α-methyl styrene; glycidyl methacrylate; carbodiimide methacrylate; $C_1$–$C_{18}$ alkyl crotonates; di-n-butyl maleate; di-octylmaleate; allyl methacrylate; di-allyl maleate; di-allylmalonate; methoxybutenyl methacrylate; isobornyl methacrylate; hydroxybutenyl methacrylate; hydroxyethyl (meth)acrylate; hydroxypropyl (meth) acrylate; acrylonitrile, vinyl chloride; ethylene; vinyl ethylene carbonate; epoxy butene; 3,4-dihydroxybutene; hydroxyethyl (meth)acrylate; methacrylamide; acrylamide; butyl acrylamide; ethyl acrylamide; vinyl (meth)acrylate; isopropenyl (meth)acrylate; cycloaliphaticepoxy (meth) acrylates; and ethylformamide. Such monomers are described in "The Brandon Worldwide Monomer Reference Guide and Sourcebook" Second Edition, 1992, Brandon Associates, Merrimack, New Hampshire; and in "Polymers and Monomers", the 1996–1997 Catalog from Polyscience, Inc., Warrington, Pa.

To increase polymer stability, a small amount (about 0.4 phr) of sodium 2-acrylamido-2-methylpropane sulfonate, (AMPS), and other stabilizing monomers may be incorporated into the SAAP. Adding such stabilizing monomers to the polymer shell, for example, aids in preventing flocculation upon the addition of a polyalkylenimine to form a PPAE. High levels of such stabilizing monomers may create water membrane layers between polymer particles in the latex or disrupt film formation. AMPS is available from Pennwalt Corporation under the LUBRIZOL 2405 Trade name.

Vinyl esters of the general Formula (2) represent further examples of non-acid vinyl monomers:

RCH=CH—O—C(O)—C(R)$_3$ (2)

In Formula (2), R is independently hydrogen or an alkyl group of up to 12 carbon atoms. Particular monomers of Formula (2) include CH$_2$=CH—O—C(O)—CH$_3$, CH$_2$=CH—O—C(O)—C(CH$_3$)$_3$, CH$_2$=CH—O—C(O)—CH(C$_2$H$_5$)(C$_4$H$_9$), and CH$_2$=CH—O—C(O)—CH$_2$CH$_3$. Vinyl ester monomers also include vinyl esters of vinyl alcohol such as the VEOVA series available from Shell Chemical Company as VEOVA 5, VEOVA 9, VEOVA 10, and VEOVA 11 products. See O. W. Smith, M. J. Collins, P. S. Martin, and D. R. Bassett, Prog. Org. Coatings 22, 19 (1993).

As a further preferred embodiment, the SAAP may also incorporate nitrogen-containing, non-acid vinyl monomers known to promote wet adhesion. Exemplary wet adhesion monomers include, for example, t-butylaminoethyl methacrylate; dimethylaminoethyl methacrylate; diethylaminoethyl methacrylate; N,N-dimethylaminopropyl methacrylamide; 2-t-butylaminoethyl methacrylate; N,N-dimethylaminoethyl acrylate; N-(2-methacrylamido-ethyl) ethylene urea; and N-(2 -methacryloyloxy-ethyl)ethylene urea. N-(2-methacryloyloxyethyl)ethylene urea is available from RohmTech as 50% solution in water under the Rohamere 6852-O trade name and as a 25% solution in water under the Rohamere 6844 trade name. N-(2-methacrylamido-ethyl)ethylene urea is available from Rhone-Poulenc under the WAM trade name.

Small amounts of acid vinyl monomers may also be used to prepare an SAAP according to the invention. Such acid vinyl monomers include, for example, acrylic acid, methacrylic acid, itaconic acid, crotonic acid, and monovinyl adipate. Incorporating acid vinyl monomers into the SAAP may increase the viscosity of the resulting latex and may have a detrimental effect on the formation of an enamine-functional polymer according to the invention. Generally these monomers are used in small amounts. Preferably, the amount of acid vinyl monomers may range, for example, from 0 to 5 phr. Greater amounts may be used to achieve a desired effect, such as increased viscosity.

Preparation of the SAAP reacts non-acid vinyl monomers, such as described above, with at least one non-self-polymerizable, surface-active vinyl monomer (also known as a non-self-polymerizable ethylenically-unsaturated surfactant or a reactive surfactant). A non-self-polymerizable surfactant monomer, rather than polymerizing with itself to form a separate polymeric surfactant, is substantially (preferably completely) incorporated into the polymer of the invention. Thus, the surfactant becomes part of the polymer. Non-self-polymerizing surfactants possessing, for example, propenylphenyl or allyl groups are preferred. Examples include surface active monomers sold by PPG Industries, Inc., as MAZON® SAM 181, 183, 184, 211 surfactants which are anionic sulfates or sulfonates and MAZON® SAM 185–187 surfactants which are nonionic surfactants. Other non-self-polymerizing, surface-active vinyl monomers include the macro monomers sold by Daiichi Kogyo Seiyaku under the names NIOGEN RN, AQUARON or HITENOL surfactants. These include polyoxyethylene alkyl phenyl ether compounds of the general formulae (3), (4), and (5):

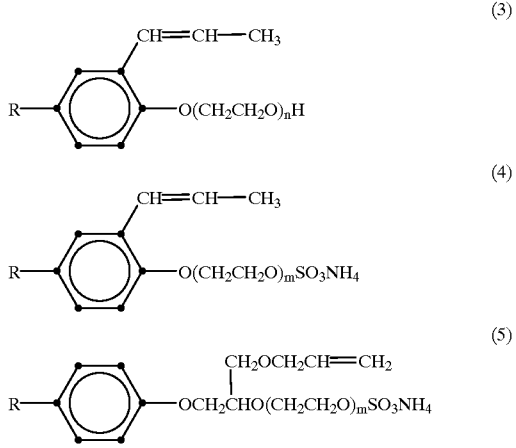

In Formulae (3), (4), and (5), R is nonyl or octyl and n and m are preferably integers of from 15 to 50 and 15 to 40, respectively. More preferably, n ranges from 20 to 40, and m from 15 to 25. HITENOL RN, HITENOL HS-20 and HITENOL A-10 products are particularly preferred non-self-polymerizing, surface-active monomers. Other such polymerizable surfactants include the sodium alkyl allyl sulfosuccinate sold by Henkel, under the trade name TREM LF-40 surfactant.

The SAAP (as well as other polymers useful in the invention) may be prepared using emulsion polymerization techniques known in the art. The polymer may, as is known in the art, be prepared using free radical emulsion polymerization techniques which yield structured or unstructured particles. As mentioned above, structured particles include, for example, core/shell particles, raspberry particles, and gradient particles. Chain transfer agents, initiators, reducing agents, buffers, and catalysts, known in the art of emulsion polymerization, may be used to prepare the polymers.

Exemplary chain transfer agents are butyl mercaptan, dodecyl mercaptan mercaptopropionic acid, 2-ethylhexyl 3-mercaptopropionate, n-butyl 3-mercaptopropionate, octyl mercaptan, isodecyl mercaptan, octadecyl mercaptan, mercaptoacetic acid, allyl mercaptopropionate, allyl mercaptoacetate, crotyl mercaptopropionate, crotyl mercaptoacetate, and the reactive chain transfer agents taught in U.S. Pat. No. 5,247,040, incorporated here by reference. In particular, 2-ethylhexyl 3-mercaptopropionate represents a preferred chain transfer agent.

Typical initiators include hydrogen peroxide, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like.

Suitable reducing agents are those which increase the rate of polymerization and include for example, sodium bisulfite, sodium hydrosulfite, sodium formaldehyde sulfoxylate, ascorbic acid, isoascorbic acid, and mixtures thereof.

Polymerization catalysts are those compounds which increase the rate of polymerization and which, in combination with the above described reducing agents, may promote decomposition of the polymerization initiator under the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof.

As discussed above, the emulsion polymerization to prepare the SAAP preferably occurs in water and in the presence of a nonionic surfactant and/or an anionic surfactant. Suitable nonionic surfactants include surfactants such as alkyl polyglycol ethers such as ethoxylation products of lauryl, oleyl, and stearyl alcohols; alkyl phenol polyglycol ethers such as ethoxylation products of octyl- or nonylphenol, diisopropyl phenol, and triisopropyl phenol. Preferred nonionic surfactants are the TERGITOL 15-S-40 and TERGITOL NP-40 surfactants available from Union Carbide. TERGITOL 15-S-40 surfactant (CAS# 68131-40-8) is a reaction product of a mixture of 11–15 carbon, linear secondary alcohols and ethylene oxide. TERGITOL NP-40 surfactant is the reaction product of a nonylphenol and about 40 moles of ethylene oxide. Another preferred nonionic surfactant is SURFYNOL 485 surfactant available from Air Products.

Anionic surfactants which may be used in the invention include surfactants such as alkali metal or ammonium salts of alkyl, aryl or alkylaryl sulfonates, sulfates, phosphates, and the like. These anionic surfactants include, for example, sodium lauryl sulfate, sodium octylphenol glycolether sulfate, sodium dodecylbenzene sulfonate, sodium lauryldiglycol sulfate, and ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like. AEROSOL 18 surfactant, a 35% solution of N-octyldecyl sulfosuccinimate in water and AEROSOL OT-75 surfactant, a 75% solution of sodium dioctyl sulfosuccinate in water, from Cytech are preferred anionic surfactants.

Water-dispersible and water-soluble polymers may also be employed as surfactants/stabilizers in the water-based latexes of the invention. Examples of such polymeric stabilizers include water-dispersible polyesters as described in U.S. Pat. Nos. 4,946,932 and 4,939,233; water-dispersible polyurethanes as described in U.S. Pat. Nos. 4,927,876 and 5,137,961; and alkali-soluble acrylic resins as described in U.S. Pat. No. 4,839,413. Cellulosics and polyvinyl alcohols may also be used.

The acetoacetoxy functionality in the SAAP may be present as free acetoacetoxy groups or as derivatives of those groups such as, for example, an enamine group or acetoacetamide group. The acetoacetoxy-functional polymer may contain both free acetoacetoxy groups and acetoacetoxy derivatives. Surfactant-containing enamine-functional polymers according to the invention may be prepared by reacting a SAAP with ammonia or a primary or secondary amine. Typically, the reaction stoichiometry uses at least one molar equivalent of amino hydrogen (N—H) groups to acetoacetoxy groups.

Surfactant-containing enamine-functional polymers represent a preferred derivative of polymers of the invention. Enamine-functional polymers may be used as the acetoacetoxy-functional polymer in the water-based latex of the invention. In water-based latexes, the enamine functionality serves to further stabilize the acetoacetoxy-groups and protect them from hydrolysis. Enamine-functional polymers have been described in Moszner et al., Polymer Bulletin 32, 419–426 (1994); European patent Application No. 0 492 847 A2; U.S. Pat. No. 5,296,530; and U.S. Pat. No. 5,484,849. These documents are incorporated here by reference.

Enamine-functional polymers may be prepared by reacting a polymer having acetoacetoxy groups with ammonia or a primary or secondary amine. The primary or secondary amine may be a monoamine compound or a polyamine compound. Preferred amines include, for example, triaminononane, $H_2N(CH_2)_3CH(CH_2NH_2)(CH_2)_4NH_2$ (CAS Registry No. 1572-55-0), available from Monsanto; 2-amino-2-methyl-1-propanol available as AMP-95 product from Angus Chemical Company, Buffalo Grove, Ill.; or, as described below, polyethylenimine, (PEI).

The preparation of enamine-functional vinyl polymers having pendant enamine groups is described in U.S. Pat. No. 5,484,849. Typically, the reaction stoichiometry uses at least one molar equivalent of amino hydrogen (N—H) groups to acetoacetoxy groups. Though the reaction is rapid, an equilibrium exists between the enamine product and the acetoacetoxy/N—H reactants. The rate of enamine formation increases with temperature. Due to the equilibrium, however, an enamine-functional polymer may have both enamine and acetoacetoxy groups.

Enamine-functional polymers or copolymers may also be prepared by polymerization of enamine-functional monomers. This method of preparation is described Moszner et al., Polymer Bulletin 32, 419–426 (1994). Enamine-functional polymers also having allyl functionalities are described in U.S. Pat. No. 5,539,073 which is incorporated here by reference. Using these methods, an enamine-functional monomer may be substituted for an acetoacetoxy-functional monomer of formula (1) to prepare surfactant-containing polymers of the invention.

To form a PPAE, a SAAP is reacted with a poly (alkylenimine). In general, a poly(alkylenimine) contains primary, secondary, and tertiary amine groups. At least a portion of the primary and secondary amine groups of the poly(alkylenimine) react with the pendant acetoacetoxy groups on the SAAP to form enamine linkages yielding a crosslinked polymeric (polyamino)enamine or PPAE.

Poly(alkylenimines), particularly poly(ethylenimine), are known to flocculate latexes, and are actually sold for that purpose. In contrast, the PPAE of the present invention, does not flocculate, but provides a stable, waterborne polymer composition. As shown in the examples below, adding a poly(alklyenimine) to a waterborne SAAP composition yields a stable waterborne PPAE composition, without flocculation. Advantageously, the PPAE affords —NH functionalities which increase adhesiveness and crosslinking ability of a coating formulation containing the PPAE.

A poly(alkylenimine) for use in the invention may have a weight average molecular weight of about 400 to about 750,000. The poly(alkylenimine) is preferably a poly (ethylenimine) (PEI) and more preferably PEI having a weight average molecular weight of about 800 to about 25,000. Such PEI compounds are commercially available from many sources and include POLYMIN poly (ethylenimine) and LUPASOL poly(ethylenimine) available from BASF Corporation. BASF polyethylenimine product literature reports the ratio of primary:secondary:tertiary amine groups to be about 1:2:1. A preferred PEI, LUPASOL G35 poly(ethylenimine), has a molecular wight of 2,000 and a ratio of primary:secondary:tertiary amine groups of about 1.5:1.4:1.

The reaction to form the PPAE may be accomplished by adding, with stirring, the appropriate poly(alkylenimine) to an emulsion of the SAAP. Sufficient poly(alkylenimine) should be used to achieve a molar ratio of amino hydrogen (N—H) groups to acetoacetoxy groups of about 0.1 to about 35, preferably a molar ratio from about 0.5 to about 20, and more preferably, from about 1 to about 5. The amount of poly(alkylenimine) added to the polymer having pendant acetoacetoxy groups may range from about 1 phr (grams dry weight poly(alkylenimine) to 100 grams dry weight resin) to about 30 phr and preferably from about 7 phr to about 25 phr. A water-based solution of the poly(alkylenimine) is preferably combined with a SAAP emulsion over about 15–30 minutes at ambient temperature. When preparing the PPAE in a single reaction vessel, the reaction mixture containing the SAAP may need to be cooled before adding the poly(alkylenimine).

In a water-based composition of the invention, the acetoacetoxy-functional, or enamine-functional polymers, (preferably a PPAE) may be present from about 5 to about 60 weight percent solids, based on the polymer's dry resin weight. More preferably, from about 25 to about 55 weight percent of the water-based composition. The examples below illustrate the polymer preparation and water-based compositions of the invention.

Latexes or other water-based compositions containing small particle size polymers, those ranging from about 25 to about 100 nm and more preferably from about 45 to about 85 nm, represent one preferred embodiment of the invention. Advantageously, latex compositions containing these small particle enamine-functional polymers have a high solids content, preferably about 25 to about 55, and more preferably, about 35 to about 55, percent solids, as well as low viscosity, preferably about 10 to about 1000 cps, and more preferably about 10 to about 200 cps. The reactions used to prepare the polymers and corresponding latexes of the invention produce low levels of coagulum.

FIG. 1 depicts the relationship between polymer particle size, percent solids, and viscosity of a latex of the invention. As FIG. 1 shows, even with a particle size of nearly 60 nm and a 50% solids level, the latex viscosity is still less than 200 cps. Achieving this relationship between particle size, solids content, and latex viscosity represents a particular advantage of the invention. Accordingly, the invention provides waterborne polymer compositions which are stable, have high solids content, but low viscosity. Advantageously, the polymer particles within the composition may be present as essentially monodispersed particles. Such compositions are particularly well-suited for coating formulations.

The pH of a waterborne polymer composition of the invention may be adjusted and/or buffered using, for example, buffers such as sodium bicarbonate, ammonium bicarbonate, ammonium dihydrogenphosphate, an ammonium poly(meth)acrylate, or a mixture of such buffers. The buffer, such as ammonium bicarbonate, may generally be added to the waterborne polymer composition to adjust and/or buffer the pH of the composition. Waterborne polymer compositions having pH values in the range of about 7.0 to 9.2, preferably 8.4 to 9.2, may be achieved using ammonium buffers. Buffered compositions of the invention are particularly useful in coating formulations.

Advantageously, the enamine-functional polymers of the invention may used to prepare stable cationic latexes having an acidic pH from an anionic stabilized latex without precipitation or coagulation of the latex. Typically, a latex of the invention containing an enamine-functional polymer, such as a PPAE, has a pH of about 10 or above. Adding a Brönsted acid to such a latex lowers the pH and below neutral pH forms a stable cationic latex. A wide range pH values may be achieved, even pH values as low as 0.5. The acid is generally added to a cooled latex. Any Brönsted acid may be used. For example, mineral acids such as sulfuric acid, phosphoric acid, hydrochloric acid, etc., and organic acids such as p-toluene sulfuric acid, acetic acid, etc. may be used. Cationic latexes such as these are particularly useful in coating compostions for hard to adhere to substrates (for example rusty metal surfaces). Exemplary coating compositions include laminate coatings, inks, textile coatings, coatings for plastic and primer coatings.

A waterborne polymer composition of the invention may also contain other additives known in those compositions and may use other emulsion polymerization methodology. U.S. Pat. No. 5,371,148 describes such additives and is incorporated here by reference.

The polymers and waterborne polymer compositions of the invention are useful in a variety of coating formulations such as metal coatings, wood coatings, plastic coatings, textile coatings, cementitious coatings, paper coatings, inks, and adhesives. Examples of such coating formulations adapted for particular uses include, but are not limited to, corrosion inhibitors, architectural coatings, concrete coatings, maintenance coatings, latex paints, industrial coatings, automotive coatings, textile back coatings, laminating inks and surface printing inks. Accordingly, the present invention relates to such coating formulations containing a waterborne polymer composition of the invention, preferably a water-based latex. The polymers and waterborne polymer compositions of the invention may be incorporated in those coating formulations in the same manner as known polymer latexes and used with the conventional components and or additives of such compositions. The coating formulations may be clear or pigmented. With their crosslinking ability, adhesion properties, and resistance properties, the water-based latexes of the invention impart new and/or improved properties to the various coating formulations.

Upon formulation, a coating formulation containing a polymer or waterborne polymer composition of the invention may then be applied to a variety of surfaces, substrates, or articles, e.g., paper, plastic, steel, aluminum, wood, gypsum board, concrete, brick, masonry, or galvanized sheeting (either primed or unprimed). The type of surface, substrate, or article to be coated generally determines the type of coating formulation used. The coating formulation may be applied using means known in the art. For example, a coating formulation may be applied by spraying or by coating a substrate. In general, the coating may be dried by heating but preferably is allowed to air dry. Advantageously, a coating employing a polymer of the invention may be thermally or ambiently cured. As a further aspect, the present invention relates to a shaped or formed article which has been coated with a coating formulations of the present invention.

A coating formulation according to the invention may comprise a polymer or waterborne polymer composition of the invention, water, a solvent, a pigment (organic or inorganic) and/or other additives and fillers known in the art.

For example, a latex paint composition of the invention may comprise a waterborne polymer composition of the invention, a pigment and one or more additives or fillers used in latex paints. Such additives or fillers include, but are not limited to, leveling, rheology, and flow control agents such as silicones, fluorocarbons, urethanes, or cellulosics; extenders; curing agents such as multifunctional isocyanates, multifunctional carbonates, multifunctional epoxides, or multifunctional acrylates; reactive coalescing aids such as those described in U.S. Pat. No. 5,349,026; flatting agents; pigment wetting and dispersing agents and surfactants; ultraviolet (UV) absorbers; UV light stabilizers; tinting pigments; extenders; defoaming and antifoaming agents; anti-settling, anti-sag and bodying agents; anti-skinning agents; anti-flooding and anti-floating agents; fungicides and mildewcides; corrosion inhibitors; thickening agents; plasticizers; reactive plasticizers; drying agents; catalysts; crosslinking agents; or coalescing agents. Specific examples of such additives can be found in Raw Materials Index, published by the National Paint & Coatings Association, 1500 Rhode Island Avenue, NW, Washington, D.C. 20005.

In addition to those uses discussed above, the preferred PPAE polymer or waterborne PPAE polymer composition of the invention may be used in many of the same industries and applications where poly(alkylenimines) such as PEI are now used. For example, a PPAE of the invention may be used as an adhesion promoter for binding proteins and enzymes to inert substrates, a shampoo additive to improve hair substantivity, as a dye fixative for textiles, a pigment dispersion for coatings, or a flocculant in water treatment.

A polymer or waterborne polymer composition of the invention can be utilized alone or in conjunction with other waterborne polymers. Such polymers include, but are not limited to, water dispersible polymers such as polyesters, polyester-amides, cellulose esters, alkyds, polyurethanes, epoxy resins, polyamides, acrylics, vinyl polymers, polymers having pendant allyl groups such as described in U.S. Pat. No. 5,539,073, styrene-butadiene polymers, vinylacetate-ethylene copolymers, and the like.

Used in combination with certain other water-dispersible polymers, the PPAE polymers of the invention bring a unique advantage to the final composition, in addition to their crosslinking ability, adhesion properties, and resistance properties. The PPAE has the ability to scavenge, via a Michael Reaction, $\alpha,\beta$-unsaturated carbonyl-containing monomer or $\alpha,\beta$-unsaturated electron withdrawing group-containing monomer remaining in the polymer latex. In other words, the PPAE scavenges residual monomers or contaminants such as ketones, aldehydes, $\alpha,\beta$-unsaturated acids, $\alpha,\beta$-unsaturated esters, $\alpha,\beta$-unsaturated amides, and $\alpha,\beta$-unsaturated nitrites. Removing these monomers can, not only eliminate the odors associated with them, but also improve health and safety when using the composition.

The following examples are intended to illustrate, not limit, the invention. The examples and various coating formulations of the invention use one or more of the following materials:

LUPASOL G35 poly(ethylenimine), 2,000 MW, sold by BASF as a 50% solution in water.

TAMOL 1124 dispersant sold by Rohm & Haas Company.

RHOPLEX RM-2020 associative thickener sold by Rohm & Haas Company.

FOAMASTER AP and FOAMASTER VF defoamers sold by Henkel.

TI-PURE R-900 titanium dioxide pigment sold by DuPont.

TRITON CF-b10 surfactant sold by Union Carbide.

SURFYNOL 104 and 104DPM products (50% Solids), sold by Air Products and Chemicals, Inc., Allentown, Pa.

DOWICIL 75 preservative, sold by Dow Chemical Company, Midland, Mich.

OMYACARB UF, a calcium carbonate extender, sold by Omya Inc., Proctor, Vt.

EASTMAN EB and EASTMAN DB solvents, sold by Eastman Chemical Company, Kingsport, Tenn.

TAFIGEL PUR 45 thickener, sold by King Industries, Norwalk, Conn.

RHEOVIS CR2 thickener, sold by Allied Colloids, Suffolk, Va.

t-butylhydroperoxide was used as a 70% solution in water.

TEXANOL coalescing solvent sold by Eastman Chemical Company, Kingsport, Tenn.

The following methods were used to evaluate the coatings and films prepared according to the invention.

Constant Temperature and Humidity Room:

Films were prepared and film measurements were conducted in a constant temperature and humidity (CTH) room at ASTM standard conditions for laboratory testing of 73.5±3.5° F. (23±2° C.) and 50±5% relative humidity.

Film Gel Fraction (FGF) and Film Swell Ratio (FSR):

Film gel fraction (FGF) is obtained by determining the insoluble weight fraction of polymer in a dry film sample. Film swell ratio (FSR) is obtained by determining the ratio of the insoluble polymer weight fraction swollen in the selected solvent (by weight) to dry weight of the insoluble weight fraction in a dry film sample. Average values are determined from quadruplicate measurements with acetone as the solvent.

The procedure used was as follows: for each sample determination, a 4"×4"325-mesh steel screen and a metal weighing boat are baked in a vacuum oven at 120° C. for 90 minutes, cooled 30 minutes over $P_2O_5$ and weighed (W1 and W2, respectively). After the latex film is dried the required number of days under constant temperature and humidity or baked in the oven at the specified time and temperature, a piece of the film is cut, weighed (W3), placed in the aluminum pan, and put aside. Another film sample is cut, weighed (W4), and placed in a screw cap jar with excess solvent on a shaker bath for 16 hours at constant temperature. The film gel is recovered by pouring the solution plus wet solids from the jar through the screen and then weighing the screen plus retained wet solids (W5). At this point, the screen plus solids and the film sample in the aluminum boat are dried in a forced air oven at 80° C. overnight and then in a vacuum oven at 120° C. for 3 hours and cooled for 30 minutes in a desiccator over $P_2O_5$. The samples are weighed and the vacuum portion of the baking procedure is repeated until reproducible weights are obtained for the screen plus dry solids (W6) and the film sample in the aluminum boat (W7).

Calculations were made by the equations shown below:

$$FGF=(W6-W1)/[(W4)*[(W7-W2)/W3]]$$

$$FSR=(W5-W1)/(W6-W1)$$

Tensile:

Tensile tests are performed in the CTH room on a on a United Tensile Tester Model STM-1-PC, which is a constant rate of elongation machine. Film samples are obtained by casting the sample on release paper with a 7 mil bird bar, drying the film for the desired time at the stated conditions, and cutting a dogbone-shaped thin-film sample with a 1" wide die. The film is measured for film thickness, mounted in the tensile tester grips and tested at a crosshead speed of 1"/minute using a 5 lb-force load cell. Ten samples are run and the five samples with the greater breaking stress are averaged for all tensile values reported according to ASTM D2370. Tensile values were calculated using Datum software from United Testing Systems, Inc., Flint, Mich.

Glass Transition:

Onset and midpoint temperatures were determined on film samples using a differential scanning calorimeter (DSC) in a nitrogen atmosphere at a heating rate of 20° C./min. values quoted are from the reheat curve.

Color:

Seven mil wet emulsion films are cast on polyester sheets. The coated polyester sheet and an uncoated control polyester sheet are allowed to dry under the specified conditions. Color is measured of both the clear emulsion film and the control panel placed on top of a white control panel using a colorimeter in the L,a,b mode.

Paint Viscosity:

Paint viscosity (in Krebs Units) was measured after 24 hours using a Krebs-Stormer viscometer.

Gloss:

Gloss was measured on 6 mil (wet) thick films cast on Leneta 2B opacity paper after 24 hours using a micro-triglossmeter by BYK-Gardner according to ASTM method D 523 Test Method for Specular Gloss.

Blocking Resistance:

Blocking resistance was determined using 6 mil (wet) films on Leneta 2B opacity paper according to ASTM 4946 Test Method for Blocking Resistance of Architectural Paints using 1 psi pressure after film dried to designated times. Heated block resistance was determined in a forced air oven at 120° F. with the painted surfaces face-to-face under 1 psi pressure for 30 minutes. The tests were numerically rated where a rating of 1 represents 100% pass where painted surfaces lift apart with no noise, a rating of 2 represents noise when painted surfaces are separated but no film degradation occurs, a rating of 3 represents some destruction of the painted surfaces when the two surfaces are separated and a rating of 4 represents 100% fail where the painted surfaces flow completely together and complete destruction of the films occurs upon separation.

Print Resistance:

Print resistance was determined using 6 mil (wet) films on Leneta 2B opacity paper according to ASTM D 2064-91 Test Method for Print Resistance of Architectural Paints using a 4 psi pressure placed on top of a #6 black rubber stopper which was placed on four layers of cheesecloth after film dried to designated times. Heated print resistance was determined in a forced air oven at 120° F. with folded cheesecloth (as above) under 4 psi pressure for 30 minutes. The tests were numerically rated where a rating of 1 represents 100% pass with no demarcation (cloth lifts off with no print left behind), a rating of 2 represents demarcations (some impression is observed), a rating of 3 represents 100% fail (the cheesecloth impregnates the film).

Scrub Resistance:

Scrub resistance was determined following ASTM D2486 Test Method for scrub resistance of architectural coatings. The coating is applied at 7 mil wet on Scrub Test Charts Form P 121-10N and allowed to dry for the specified period of time. The panel is placed in a Gardco Scrub Machine, Model D-10V, 10 g of Standardized Scrub Medium (abrasive type) for ASTM D2486 and D3450 is placed on the scrub brush, the panel is wet with 5 ml DI water, the test machine counter is zeroed, and the test is run at the maximum test speed on the machine. After each 400 cycles before failure, the brush is removed and 10 more g of scrub medium is added evenly on the bristles, the brush is replaced, 5 ml of DI water is placed on the panel and the test is continued. The test is stopped at 1000 cycles or failure, whichever comes first. Failure is defined as the number of cycles to remove the paint film fully in one continuous line across the width of the shim.

Wet Adhesion Test:

This procedure tests the coatings adhesion to an aged, alkyd substrate under wet, scrubbing conditions. This procedure is described in "VYNATE™ (Union Carbide Chemicals and Plastics Corporation)—Vinyl Emulsion Vehicles for Semigloss Interior Architectural Coatings", M. J. Collins, et al., presented at the 19th Annual "Water-Borne High-Solids and Powder Coating Symposium", Feb. 26–28, 1992, New Orleans, La, USA.

A ten-mil drawdown of a commercial gloss alkyd paint is made on a "Leneta" scrub panel (adhesion varies from alkyd to alkyd—a Glidden Industrial Enamel was used.) The alkyd film is allowed to age one week at ambient conditions, then baked at 110° F. for 24 hours, and then aged at least one more week at ambient conditions. A seven-mil drawdown of the test paint is then made over the aged alkyd and allowed to air dry three days. (In order to differentiate between samples that pass this test, dry times may be shortened. Seven days is a common period, and occasionally 5 hours dry time is used. Constant temperature/humidity conditions, 72° F./50%, are normally used for drying.) The test paint is then cross-hatched with a razor and submerged in water for 30 minutes. The paint film is inspected for blistering and scratched with the fingernail to gauge the adhesion. While still wet, the panel is placed on a "Gardner" scrub machine. Ten ml of five percent "LAVA™" soap slurry are added to the film, and the nylon scrub brush (WG 2000NB) is passed over the scored paint film area. Water is added as needed to keep the paint film wet (flooded). The number of brushing cycles for initial peel and ten percent peel are noted. The number of cycles for complete removal of the film is often noted also.

EXAMPLE 1

Preparation of a Large Particle Size, Core/Shell Enamine-Containing Waterborne Polymer To a 3000 mL resin kettle equipped with a condenser, nitrogen purge, and subsurface feed tube were added 640 g of water, 4.05 g of TREM LF-40, 1.93 g of TERGITOL NP-40(70%), 7.3 g of sodium carbonate, 44.24 g of methyl methacrylate, 8.26 g of styrene, 57.09 g of 2-ethylhexyl acrylate, and 0.252 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 355 g of water, 11.7 g of TREM LF-40, 10.21 g of TERGITOL NP-40 (70%), 271.78 g of methyl methacrylate, 50.72 g of styrene, 350.63 g of 2-ethylhexyl acrylate, and 1.55 g of trimethylolpropane triacrylate was begun at 8.38 g/min. Five minutes after the first emulsion feed was begun, an initiator solution composed of 4.36 g of sodium persulfate dissolved in 112 g of water was fed at 0.466 g/min. After the first emulsion feed was completed, a second emulsion feed composed of 171 g of water, 12.79 g of AEROSOL 18, 5.09 g of TERGITOL NP-40 (70%), 180.88 g of styrene, 90.0 g of 2-ethylhexyl acrylate, 143.92 g of acetoacetoxyethyl methacrylate, and 1.68 g of the sodium 2-acrylamido-2-methylpropanesulfonate (50% in water) was fed at 8.38 g/min. Five minutes after the last feed, an initiator solution of 1.34 g of t-butyl hydroperoxide, and 1.34 g of sodium formaldehyde sulfoxylate dissolved in 40.2 g of water was charged and heating continued for 30 minutes. The emulsion was cooled, and 45 g of ammonium hydroxide (28%) were pumped in over 15 minutes. The latex was then filtered through 100 mesh wire screen. Solids level, 46.0; pH, 8.4; amount of dried material (100 mesh screen), 11.6 g; particle size (Dw), 236 nm, ZETA potential, −47.1 mv, latex gel fraction/swell ratio 42/9.6. Infrared analysis of clear films cast over ZnSe showed an absorption at 1565 cm$^{-1}$ which represents an enamine moiety.

EXAMPLE 2

Preparation of a Large Particle Size, Core/Shell PEI-Containing Waterborne Polymer The procedure for the preparation of this latex was similar to the latex preparation described in Example 1 except that 247.35 g of poly(ethylenimine) (50% in water) was added in place of the ammonium hydroxide solution. Mole ratio of N—H group to acetoacetoxy group was 4.27. The latex was then filtered through 100 mesh wire screen. Solids level, 46.8; pH, 10; amount of dried material (100 mesh screen), 3.28 g; particle size (Dw), 225 nm, ZETA potential, −23.7 mv (pH=11.7), latex gel fraction/swell ratio 75/6.1. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine). After reacting the poly (ethylenimine) with the pendant acetoacetoxy group, the latex was centrifuged and the water phase analyzed. Elemental analysis of the water phase showed that at most 2% of the poly(ethylenimine) remained in the water phase.

EXAMPLE 3

Preparation of a Large Particle Size, Core/Shell PEI-Containing Waterborne Polymer The procedure for the preparation of this latex was similar to the latex preparation described in Example 1 except that 316.86 g of poly(ethylenimine) (50% in water) was added in place of the amrnonium hydroxide solution. Mole ratio of N—H group to acetoacetoxy group was 5.47. The latex was then filtered through 100 mesh wire screen. Solids level, 46.5; pH, 10; amount of dried material (100 mesh screen), 4.11 g; particle size (Dw), 225 nm, latex gel fraction/swell ratio 76/5.7. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine). After reacting the poly(ethylenimine) with the pendant acetoacetoxy group, the latex was centrifuged and the water phase analyzed. Elemental analysis of the water phase showed that at most 2% of the poly(ethylenimine) remained in the water phase.

EXAMPLE 4

Preparation of a Small Particle Size, Core/Shell Enamine-Containing Waterborne Polymer To a 3000 mL resin kettle equipped with a condenser, nitrogen purge, and subsurface feed tube were added 1100 g of water, 49.0 g of HITENOL HS-20, 8.05 g of TERGITOL NP-40(70%), 7.3 g of sodium carbonate, 44.24 g of methyl methacrylate, 8.26 g of styrene, 57.09 g of 2-ethylhexyl acrylate, and 0.252 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 273.5 g of water, 19.65 g of AEROSOL 18, 20.19 g of TERGITOL NP-40 (70%), 271.78 g of methyl methacrylate, 50.72 g of styrene, 350.63 g of 2-ethylhexyl acrylate, and 1.55 g of trimethylolpropane triacrylate was begun at 8.38 g/min. Five minutes after the first emulsion feed was begun, an initiator solution composed of 4.36 g of sodium persulfate dissolved in 112 g of water was fed at 0.466 g/min. After the first emulsion feed was completed, a second emulsion feed composed of 147 g of water, 12.15 g of AEROSOL 18, 12.5 g of TERGITOL NP-40 (70%), 180.88 g of styrene, 90.0 g of 2-ethylhexyl acrylate, 143.92 g of acetoacetoxyethyl methacrylate, and 1.68 g of the sodium 2-acrylamido-2-methylpropanesulfonate (50% in water) was fed at 8.38 g/min. Five minutes after the last feed, an initiator solution of 1.34 g of t-butyl hydroperoxide, and 1.34 g of sodium formaldehyde sulfoxylate dissolved in 40.2 g of water was charged and heating continued for 30 minutes. The emulsion was cooled, and 45 g of ammonium hydroxide (28%) were pumped in over 15 minutes. The latex was then filtered through 100 mesh wire screen. Solids level, 41.0; amount of dried material (100 mesh screen), 4.8 g; particle size (Dw), 65 nm, latex gel fraction/swell ratio 57/11.6. Infrared analysis of clear films cast over ZnSe showed an absorption at 1565 cm$^{-1}$ which represents an enamine moiety.

EXAMPLE 5

Preparation of a Small Particle Size, Core/Shell PEI-Containing Waterborne Polymer The procedure for the preparation of this latex was similar to the latex preparation described in Example 1 except that 247.35 g of poly(ethylenimine) (50% in water) was added in place of the ammonium hydroxide solution. Mole ratio of N-H group to acetoacetoxy group was 4.27. The latex was then filtered through 100 mesh wire screen. Solids level, 41.6; pH, 10; amount of dried material (100 mesh screen), 3.03 g; particle size (Dw), 58 nm, latex gel fraction/swell ratio 62/5.6. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine). After reacting the poly(ethylenimine) with the pendant acetoacetoxy group, the latex was centrifuged and the water phase analyzed. Elemental analysis of the water phase showed that at most 2% of the poly(ethylenimine) remained in the water phase.

EXAMPLE 6

Preparation of a Small Particle Size, Core/Shell PEI-Containing Waterborne Polymer The procedure for the preparation of this latex was similar to the latex preparation described in Example 1 except that 314.45 g of poly(ethylenimine) (50% in water) was added in place of the ammonium hydroxide solution. Mole ratio of N—H group to acetoacetoxy group was 4.27. The latex was then filtered through 100 mesh wire screen. Solids level, 41.6; pH, 10; amount of dried material (100 mesh screen), 3.03 g; particle size (Dw), 70 nm, latex gel fraction/swell ratio 61/6.5. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine). After reacting the poly(ethylenimine) with the pendant acetoacetoxy group, the latex was centrifuged and the water phase analyzed. Elemental analysis of the water phase showed that at most 2% of the poly(ethylenimine) remained in the water phase.

EXAMPLE 7

Preparation of a Large Particle Size, Core/Shell PEI-Containing Waterborne Polymer To a 3000 mL resin kettle equipped with a condenser, nitrogen purge, and subsurface feed tube were added 640 g of water, 4.05 g of TREM LF-40, 1.93 g of TERGITOL NP-40(70%), 7.3 g of sodium carbonate, 55.23 g of methyl methacrylate, 4.03 g of styrene, 47.40 g of 2-ethylhexyl acrylate, 20.15 g of acetoacetoxyethyl methacrylate, and 0.336 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 355 g of water, 11.7 g of TREM LF-40, 10.21 g of TERGITOL NP-40 (70%), 271.78 g of methyl methacrylate, 50.72 g of styrene, 350.63 g of 2-ethylhexyl acrylate, and 1.55 g of trimethylolpropane triacrylate was begun at 8.38 g/min. Five minutes after the first emulsion feed was begun, an initiator solution composed of 4.36 g of sodium persulfate dissolved in 112 g of water was fed at 0.5.36 g/min. After the first emulsion feed was completed, a second emulsion feed composed of 171 g of water, 12.79 g of AEROSOL 18, 5.09 g of TERGITOL NP-40 (70%), 211.03 g of styrene, 80.0 g of 2-ethylhexyl acrylate, 123.77 g of acetoacetoxyethyl methacrylate, and 1.68 g of the sodium 2-acrylamido-2-methylpropanesulfonate (50% in water) was fed at 8.38 g/min. Five minutes after the last feed, an initiator solution of 1.34 g of t-butyl hydroperoxide, and 1.34 g of sodium formaldehyde sulfoxylate dissolved in 40.2 g of water was charged and heating continued for 30 minutes. The emulsion was cooled, and filtered through 100 mesh wire screen. Solids level, 46.64; pH, 8.2; amount of dried material (100 mesh screen), 24.65 g; Particle Size, (Electron Microscopy), 450 nm. To 2500 g of this latex were added over 15 minutes 115 g of poly(ethylenimine) (50%). Solids, 46.6%; pH, 10.4; Particle Size (Electron Microscopy), 450 nm. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine).

EXAMPLE 8

Preparation of a Small Particle Size, Unstructured Enamine-Containing Waterborne Polymer To a 1000 mL resin kettle equipped with a condenser, nitrogen purge, and subsurface feed tube were added 290 g of water, 15.52 g of HITENOL HS-20, 2.55 g of TERGITOL NP-40 (70%), 3.5 g of sodium carbonate, 8.10 g of methyl methacrylate, 5.38 g of 2-ethylhexyl acrylate, and 4.43 g of acetoacetoxyethyl methacrylate. A nitrogen purge was begun, then the contents of the reactor brought up to 80° C. at 400 rpm. After reaching 80° C., an initiator charge composed of 2.30 g of sodium persulfate dissolved in 13.0 g of water was added to the reactor. An emulsion feed composed of 120 g of water, 6.55 g of AEROSOL 18, 10.22 g of TERGITOL NP-40 (70%), 153.66 g of methyl methacrylate, 102.03 g of 2-ethylhexyl acrylate, and 84.21 g of acetoacetoxyethyl methacrylate was begun at 8.38 g/min. Five minutes after the first emulsion feed was begun, an initiator solution composed of 1.3 g of sodium persulfate dissolved in 33.5 g of water was fed at 0.536 g/min. Five minutes after the monomer feed, an initiator solution of 0.40 g of t-butyl hydroperoxide, and 0.40 g of sodium formaldehyde sulfoxylate dissolved in 12 g of water was charged and heating continued for 30 minutes. The emulsion was cooled, and 27.7 g of ammonium hydroxide (28%) were pumped in over 15 minutes. The latex was then filtered through 100 mesh wire screen. Solids level, 43.3; amount of dried material (100 mesh screen), 0.12 g; particle size (Dn), 50 um. Infrared analysis of clear films cast over ZnSe showed an absorption at 1568 cm$^{-1}$ which represents an enamine moiety.

EXAMPLE 9

Preparation of a Small Particle Size, Unstructured PEI-Containing Waterborne Polymer To a 1000 mL resin kettle equipped with a condenser, nitrogen purge, and subsurface feed tube were added 232 g of water, 12.42 g of HITENOL HS-20, 2.02 g of TERGITOL NP-40(70%), 2.8 g of sodium carbonate, 4.15 g of methyl methacrylate, 5.38 g of 2-ethylhexyl acrylate, and 4.33 g of acetoacetoxyethyl methacrylate. A nitrogen purge was begun, then the contents of the reactor brought up to 80° C.

at 400 rpm. After reaching 80° C., an initiator charge composed of 1.84 g of sodium persulfate dissolved in 10.4 g of water was added to the reactor. An emulsion feed composed of 96 g of water, 5.24 g of AEROSOL 18, 8.18 g of TERGITOL NP-40 (70%), 78.90 g of methyl methacrylate, 110.82 g of 2-ethylhexyl acrylate, and 82.36 g of acetoacetoxyethyl methacrylate was begun at 8.38 g/min. Five minutes after the first emulsion feed was begun, an initial solution composed of 1.04 g dissolved in 26.8 g of water was fed at 0.536 g/min. Five minutes after the monomer feed, an initiator solution of 0.32 g of t-butyl hydroperoxide, and 0.32 g of sodium formaldehyde sulfoxylate dissolved in 9.6 g of water was charged and heating continued for 30 minutes. The emulsion was cooled to 30° C., and 139.58 g of poly(ethylenimine) (50% in water) were pumped in over 15 minutes. Mole ratio of N—H group to acetoacetoxy group was 4.00. The latex was then filtered through 100 mesh wire screen. Solids level, 42.8; pH, 10; amount of dried material (Recoverable Solids, 100 mesh screen), 0.10 g; particle size (Dw), 54 nm. Infrared analysis of clear films cast over ZnSe showed an absorption at 1653 $cm^{-1}$ and 1592 $cm^{-1}$ and a disappearance of the absorbencies at 1631 $cm^{-1}$ and 1655 $cm^{-1}$ after addition of the poly(ethylenimine). After reacting the poly(ethylenimine) with the pendant acetoacetoxy group, the latex was centrifuged and the water phase analyzed. Elemental analysis of the water phase showed that at most 1% of the poly (ethylenimine) remained in the water phase.

EXAMPLE 10

Preparation of a Large Particle Size, Core/Shell Allyl- and Acetoacetoxy-Containing Waterborne Polymer To a 3000 mL resin kettle equipped with a condenser, nitrogen purge, and subsurface feed tube were added 529.6 g of water, 2.87 g of TREM LF-40, 1.36 g of TERGITOL NP-40 (70%), 7.1 g of sodium carbonate, 5.01 g of methyl methacrylate, 28.95 g of styrene, 17.54 g of methyl methacrylate, 33.78 g of 2-ethylhexyl acrylate, and 0.16 g of trimethylolpropane triacrylate. A nitrogen purge was begun, then the contents of the reactor brought up to 80° C. at 400 rpm. After reaching 80° C., an initiator solution composed of 5.28 g of sodium persulfate dissolved in 20.88 g of water was added to the reactor. An initiator solution composed of 3.56 g of sodium persulfate dissolved in 53.77 g of water was fed into the reactor at 0.336 g/min. Ten minutes after the initiator feed was started, an emulsion feed composed of 192.6 g of water, 8.31 g of TREM LF-40, 7.25 g of TERGITOL NP-40 (70%), 107.72 g of methyl methacrylate, 177.89 g of styrene, 207.54 g of 2-ethylhexyl acrylate, and 0.98 g of trimethylolpropane triacrylate was begun at 5.25 g/min. After the first emulsion feed was completed, the lines were rinsed with 160 g of water, and heating continued. After 25 minutes, a second emulsion feed composed of 205 g of water, 15.73 g of AEROSOL 18, 6.12 g of TERGITOL NP-40 (70%), 251.8 g of styrene, 175.1 g of 2-ethylhexyl acrylate, 94.94 g of acetoacetoxyethyl methacrylate, 47.92 g of allyl methacrylate, 23.99 g of dimethylaminoethyl methacrylate, and 4.79 g of 2-ethylhexyl 3-mercaptopropionate was started at 8 g/minute. Ten minutes after the feeds were completed, an initiator solution composed of 1.34 g of sodium formaldehyde sulfoxylate and 1.34 g of t-butylhydroperoxide dissolved in 40.2 g of water was fed into the reactor over 15 minutes. The latex was then filtered through 100 mesh wire screen. Solids level, 47%; amount of dried material (100 mesh screen), 1.7 g.

EXAMPLE 11

Preparation of a Small Particle Size, Core/Shell Amine-Containing Waterborne Polymer To a 3000 mL resin kettle equipped with a condenser, nitrogen purge, and subsurface feed tube were added 1100 g of water, 49 g of HITENOL HS-20, 8.05 g of TERGITOL NP-40 (70%), 7.3 g of sodium carbonate, 36.6 g of methyl methacrylate, 36.1 g of styrene, 36.2 g of 2-ethylhexyl acrylate, and 0.335 g of trimethylolpropane triacrylate. A nitrogen purge was begun, then the contents of the reactor brought up to 80° C. at 400 rpm. After reaching 80° C., an initiator solution composed of 7.05 g of sodium persulfate dissolved in 43.55 g of water was added to the reactor. An initiator solution composed of 4.36 g of sodium persulfate dissolved in 112 g of water was started at 0.466 g/min. Thirty minutes after the initiator feed was begun, an emulsion feed composed of 355 g of water, 19.65 g of AEROSOL 18, 20.19 g of TERGITOL NP-40 (70%), 224.84 g of methyl methacrylate, 221.95 g of styrene, 224.4 g of 2-ethylhexyl acrylate, and 2.06 g of trimethylolpropane triacrylate was begun at 5.24 g/min. After the first emulsion feed was completed, a second emulsion feed composed of 147 g of water, 12.15 g of AEROSOL 18, 12.48 g of TERGITOL NP-40 (70%), 168.6 g of styrene, 80 g of 2-ethylhexyl acrylate, and 167.9 g of acetoacetoxyethyl methacrylate was fed at 8.4 g/min. Ten minutes after the feeds were completed, an initiator solution composed of 1.34 g of sodium formaldehyde sulfoxylate and 1.34 g of t-butylhydroperoxide dissolved in 40.2 g of water was charged to the reactor and heating continued for 30 minutes. The emulsion was cooled to less than 35° C., and 283.84 g of polyethylenimine (50%) were pumped in over 15 minutes. The latex was then filtered through 100 mesh wire screen. Solids level, 41.8; amount of dried material (100 mesh screen), 0.60 g; pH, 10.5. Infrared analysis of clear films cast over ZnSe showed an absorption at 1565 $cm^{-1}$ which represents an enamine moiety.

EXAMPLE 12

Preparation of a Large Particle Size, Unstructured Acetoacetoxy-Containing Waterborne Polymer To a 1000 mL resin kettle equipped with a condenser, nitrogen purge, and subsurface feed tube were added 294 g of water, 1.34 g of TREM LF-40, 1.79 g of TERGITOL NP-40 (100%), 2.044 g of sodium carbonate, 9.67 g of styrene, 6.09 g of 2-ethylhexyl acrylate, and 0.01 g of sodium 2-acrylamido-2-methylpropanesulfonate (50% in water). A nitrogen purge was begun, then the contents of the reactor brought up to 80° C. at 400 rpm. After reaching 80° C., an initiator solution composed of 2.3 g of sodium persulfate dissolved in 13.0 g of water was added to the reactor. An initiator solution composed of 1.3 g of sodium persulfate dissolved in 34 g of water was fed into the reactor at 0.16 g/min. Ten minutes after the initiator feed was started, an emulsion feed composed of 120 g of water, 9.94 g of AEROSOL 18, 7.16 g of TERGITOL NP-40 (100%), 186.6 g of styrene, 115.63 g of 2-ethylhexyl acrylate, 40.81 g of acetoacetoxyethyl methacrylate, and 0.52 g of sodium 2-acrylamido-2-methylpropanesulfonate (50% in water) was fed into the reactor at 1.72 g/min. Five minutes after the feeds were completed, then an initiator solution composed of 0.4 g of sodium persulfate and 0.4 g of sodium metabisulfite dissolved in 12 g of water was added to the reactor and heating continued for 30 minutes. The latex was then filtered through 100 mesh wire screen. Solids level, 42.6; amount of dried material (100 mesh screen), 0.20 g; particle size (Dw), 153 nm; Tg of Polymer, 14° C.

EXAMPLE 13

Preparation of a Large Particle Size, Unstructured Acetoacetoxy-Containing Waterborne Polymer To a 1000 mL resin kettle equipped with a condenser, nitrogen purge, and subsurface feed tube were added 351 g of water, 0.76 g of AEROSOL OT, 5.11 g of TERGITOL NP-40 (100%), 2.05 g of sodium carbonate, 3.58 g of styrene, 11.63 g of 2-ethylhexyl acrylate, and 2.68 g of sodium 2-acrylamido-2-methylpropanesulfonate (50% in water). A nitrogen purge was begun, then the contents of the reactor brought up to 80° C. at 400 rpm. After reaching 80° C., an initiator solution composed of 2.3 g of sodium persulfate dissolved in 13.0 g of water was added to the reactor. An initiator solution composed of 1.3 g of sodium persulfate dissolved in 34 g of water was fed into the reactor at 0.16 g/min. Ten minutes after the initiator feed was started, a monomer feed composed of 4.10 g of AEROSOL OT (75%), 88.02 g of styrene, 221.06 g of 2-ethylhexyl acrylate, 51.01 g of acetoacetoxyethyl methacrylate, and 0.26 g of sodium 2-acrylamido-2-methylpropanesulfonate (50% in water) was fed into the reactor at 1.72 g/min. Five minutes after the feeds were completed, then an initiator solution composed of 0.4 g of sodium persulfate and 0.4 g of sodium metabisulfite dissolved in 12 g of water was added to the reactor and heating continued for 30 minutes. The latex was then filtered through 100 mesh wire screen. Solids level, 47.6; amount of dried material (100 mesh screen), 0.10 g; particle size (Dw), 122 nm; Tg of Polymer, −28° C.

EXAMPLE 14

Preparation of a Large Particle Size, Unstructured Acetoacetoxy-Containing Waterborne Polymer To a 1000 mL resin kettle equipped with a condenser, nitrogen purge, and subsurface feed tube were added 294 g of water, 1.34 g of TREM LF-40, 1.79 g of TERGITOL NP-40 (100%), 2.044 g of sodium carbonate, 12.71 g of styrene, 3.84 g of isooctyl acrylate, and 0.014 g of sodium 2-acrylamido-2-methylpropanesulfonate (50% in water). A nitrogen purge was begun, then the contents of the reactor brought up to 80° C. at 400 rpm. After reaching 80° C., an initiator solution composed of 2.3 g of sodium persulfate dissolved in 13.0 g of water was added to the reactor. An initiator solution composed of 1.3 g of sodium persulfate dissolved in 34 g of water was fed into the reactor at 0.16 g/min. Ten minutes after the initiator feed was started, an emulsion feed composed of 120 g of water, 9.94 g of AEROSOL 18, 7.16 g of TERGITOL NP-40 (100%), 241.47 g of styrene, 73.02 g of isooctyl acrylate, 25.61 g of acetoacetoxyethyl methacrylate, and 0.52 g of sodium 2-acrylamido-2-methylpropanesulfonate (50% in water) was fed into the reactor at 1.72 g/min. Five minutes after the initiator solution feed was in, an initiator solution of 0.72 g of sodium formaldehyde sulfoxylate and 1.03 g of t-butylhydroperoxide dissolved in 12 g of water was added to the reactor. The latex was then filtered through 100 mesh wire screen. Solids level, 43.8; amount of dried material (100 mesh screen); 3.3 g; pH, 7.4; particle size (Dw), 151 nm; Tg of Polymer, 16° C.

EXAMPLE 15

Preparation of a Large Particle Size, Core/Shell Amine-Containing Waterborne Polymer To a 1000 mL resin kettle equipped with a condenser, nitrogen purge, and subsurface feed tube were added 192 g of water, 1.22 g of TREM LF-40, 0.79 g of TERGITOL NP-40 (70%), 2.4 g of sodium carbonate, 13.55 g of methyl methacrylate, 1.21 g of styrene, 17.24 g of 2-ethylhexyl acrylate, 0.10 g of trimethylolpropane triacrylate, and 6.04 g of acetoacetoxyethyl methacrylate. A nitrogen purge was begun, then the contents of the reactor brought up to 80° C. at 400 rpm. After reaching 80° C., an initiator solution composed of 2.31 g of sodium persulfate dissolved in 13.06 g of water was added to the reactor. An initiator solution composed of 1.31 g of sodium persulfate dissolved in 34 g of water was started at 0.54 g/min. Thirty minutes after the initiator feed was begun, an emulsion feed composed of 106 g of water, 3.51 g of TREM LF-40, 3.06 g of TERGITOL NP-40 (70%), 83.23 g of methyl methacrylate, 7.44 g of styrene, 105.91 g of 2-ethylhexyl acrylate, and 0.619 g of trimethylolpropane triacrylate was begun at 8.38 g/min. After the first emulsion feed was completed, the feed lines were washed with 80 g of water, and the temperature held at 80° C. for 30 minutes. A second emulsion feed composed of 53 g of water, 3.84 g of AEROSOL 18, 1.53 g of TERGITOL NP-40 (70%), 63.31 g of styrene, 24.0 g of 2-ethylhexyl acrylate, 37.13 g of acetoacetoxyethyl methacrylate, and 0.50 g of the sodium 2-acrylamido-2-methylpropanesulfonate (50% in water) was fed at 8.38 g/min. Five minutes after the initiator solution feed was in, an initiator solution of 0.40 g of sodium formaldehyde sulfoxylate and 0.40 g of t-butylhydroperoxide dissolved in 12.1 g of water was added to the reactor. The emulsion was cooled to less than 35° C., and 69.51 g of polyethylenimine (50%) were pumped in over 15 minutes. The latex was then filtered through 100 mesh wire screen. Solids level, 46.6; amount of dried material (100 mesh screen), 0.15 g; particle size (Dw), 167 nm; Tg, 5° C.

EXAMPLE 16

Preparation of a Large Particle Size, Core/Shell Amine-Containing Waterborne Polymer To a 1000 mL resin kettle equipped with a condenser, nitrogen purge, and subsurface feed tube were added 640 g of water, 4.05 g of TREM LF-40, 1.93 g of TERGITOL NP-40 (70%), 8.0 g of sodium carbonate, 55.23 g of methyl methacrylate, 4.04 g of styrene, 47.4 g of 2-ethylhexyl acrylate, 0.33 g of trimethylolpropane triacrylate, and 20.1 g of acetoacetoxyethyl methacrylate. A nitrogen purge was begun, then the contents of the reactor brought up to 80° C. at 400 rpm. After reaching 80° C., an initiator solution composed of 7.0 g of sodium persulfate dissolved in 43.6 g of water was added to the reactor. An initiator solution composed of 4.36 g of sodium persulfate dissolved in 122 g of water was started at 0.54 g/min. Thirty minutes after the initiator feed was begun, an emulsion feed composed of 355 g of water, 11.7 g of TREM LF-40, 10.21 g of TERGITOL NP-40 (70%), 399.3 g of methyl methacrylate, 24.78 g of styrene, 291.2 g of 2-ethylhexyl acrylate, and 2.06 g of trimethylolpropane triacrylate was begun at 8.38 g/min. After the first emulsion feed was completed, the feed lines were washed with 80 g of water, and the temperature held at 80° C. for 30 minutes. A second emulsion feed composed of 171 g of water, 12.79 g of AEROSOL 18, 5.09 g of TERGITOL NP-40 (70%), 211 g of styrene, 80.0 g of 2-ethylhexyl acrylate, 123.8 g of acetoacetoxyethyl methacrylate, and 1.68 g of the sodium 2-acrylamido-2-methylpropanesulfonate (50% in water) was fed at 8.38 g/min. Five minutes after the initiator solution feed was in, an initiator solution of 1.34 g of sodium formaldehyde sulfoxylate and 1.34 g of t-butylhydroperoxide dissolved in 40.2 g of water was added to the reactor. The emulsion was cooled to less than 35° C., and 121 g of polyethylenimine (50%) were pumped in over 15 minutes. The latex was then filtered through 100 mesh wire screen. Solids level, 46.6; amount of dried material (100 mesh screen), 25 g; particle size (Dw), 450 nm; Tg, 14° C.; pH, 10.4

EXAMPLE 17

Preparation of a Large Particle Size, Core/Shell Allyl- and Acetoacetoxy-Containing Waterborne Polymer To a 3000 mL resin kettle equipped with a condenser, nitrogen purge, and subsurface feed tube were added 480 g of water, 1.30 g of HITENOL HS-20, 1.08 g of TERGITOL 15-S-40 (100%), 5.84 g of sodium carbonate, 5.01 g of methyl methacrylate, 8.27 g of styrene, 9.63 g of 2-ethylhexyl acrylate, and 0.0689 g of trimethylolpropane triacrylate. A nitrogen purge was begun, then the contents of the reactor brought up to 80° C. at 400 rpm. After reaching 80° C., an initiator solution composed of 6.16 g of sodium persulfate dissolved in 34.84 g of water was added to the reactor. An initiator solution composed of 3.48 g of sodium persulfate dissolved in 89.8 g of water was fed into the reactor at 0.336 g/min. Ten minutes after the initiator feed was started, an emulsion feed composed of 210.4 g of water, 2.75 g of AEROSOL OT, 5.72 g of TERGITOL 15-S-40 (100%), 95.21 g of methyl methacrylate, 157.23 g of styrene, 183.02 g of 2-ethylhexyl acrylate, and 1.31 g of trimethylolpropane triacrylate was begun at 5.25 g/min. After the first emulsion feed was completed, the lines were rinsed with 60 g of water, and heating continued. After 25 minutes, a second emulsion feed composed of 138 g of water, 8.74 g of AEROSOL 18, 2.85 g of TERGITOL 15-S-40 (100%), 225.8 g of styrene, 153.5 g of 2-ethylhexyl acrylate, 47.97 g of acetoacetoxyethyl methacrylate, 28.78 g of allyl methacrylate, 18.81 g of dimethylaminoethyl methacrylate, and 4.894 g of 2-ethylhexyl 3-mercaptopropionate was started at 8 g/minute. Ten minutes after the feeds were completed, the reactor was cooled to 65° C., then an initiator solution composed of 2.74 g of sodium formaldehyde sulfoxylate dissolved in 32.2 g of water, and 5.05 g of a catalyst solution composed of 0.5% iron (II) sulfate chelated with ethylenediamine tetracetic acid were added to the reactor. A solution of 2.94 g of t-butylhydroperoxide dissolved in 32.2 g of water was fed into the reactor over 15 minutes. The latex was then filtered through 100 mesh wire screen. Solids level, 46.9; pH, 7.6; amount of dried material (100 mesh screen), 2.0 g; particle size (Dw), 197 nm.

EXAMPLE 18

Preparation of a Small Particle Size, Core/Shell Amine-Containing Waterborne Polymer To a 3000 mL resin kettle equipped with a condenser, nitrogen purge, and subsurface feed tube were added 720.4 g of water, 39.2 g of HITENOL HS-20, 1.08 g of TERGITOL 15-S-40 (100%), 5.84 g of sodium carbonate, 26.14 g of methyl methacrylate, 35.2 g of styrene, 26.4 g of 2-ethylhexyl acrylate, and 0.264 g of trimethylolpropane triacrylate. A nitrogen purge was begun, then the contents of the reactor brought up to 80° C. at 400 rpm. After reaching 80° C., an initiator solution composed of 6.16 g of sodium persulfate dissolved in 34.84 g of water was added to the reactor. An initiator solution composed of 2.08 g of sodium persulfate dissolved in 53.6 g of water was started at 0.336 g/min. Thirty minutes after the initiator feed was begun, an emulsion feed composed of 158.4 g of water, 15.72 g of AEROSOL 18, 11.00 g of TERGITOL 15-S-40 (100%), 110.4 g of methyl methacrylate, 148.7 g of styrene, 111.52 g of 2-ethylhexyl acrylate, and 1.12 g of trimethylolpropane triacrylate was begun at 5.24 g/min. After the first emulsion feed was completed, the feed lines were washed with 80 g of water, and the temperature held at 80° C. for 30 minutes. The reactor was then cooled to 65° C., and an initiator solution of 2.74 g of sodium formaldehyde sulfoxylate dissolved in 16 g of water, and 5.05 g of a catalyst solution composed of 0.5% iron (II) sulfate chelated with ethylenediamine tetracetic acid were added to the reactor. A second emulsion feed composed of 138.4 g of water, 9.72 g of AEROSOL 18, 6.99 g of TERGITOL 15-S-40 (100%), 191.90 g of styrene, 43.25 g of methyl methacrylate, 143.92 g of 2-ethylhexyl acrylate, 95.95 g of acetoacetoxyethyl methacrylate, and 9.45 g of the sodium 2-acrylamido-2-methylpropanesulfonate (50% in water) was fed at 5.24 g/min. A solution of 3.92 g of t-butylhydroperoxide dissolved in 32 g of water was fed into the reactor during the second emulsion feed at 0.14 g/min. After the t-butylhydroperoxide feed was completed, heating was continued for 30 minutes. The emulsion was cooled to less than 35° C., and 122 g of polyethylenimine (50%) were pumped in over 15 minutes. The latex was then filtered through 100 mesh wire screen. Solids level, 44.6; amount of dried material (100 mesh screen), 1.1 g; particle size (Dw), 54 nm; pH, 10.5. Infrared analysis of clear films cast over ZnSe showed an absorption at 1565 cm$^{-1}$ which represents an enamine moiety.

EXAMPLE 19

Preparation of Pigment Grind

A pigment grind was prepared using a Premier disperser, as below, and a portion of the grind was used to letdown each specified paint.

| Material: | Volume: |
| --- | --- |
| Deionized (DI) Water | 120.0 |
| TAMOL 1124 dispersant | 12.0 |
| TRITON CF-10 | 6.0 |
| Propylene Glycol | 6.0 |
| FOAMASTER AP | 6.0 |

The materials were dispersed well and then was added under agitation:

| TI-PURE R-900 | 600.0 |
| --- | --- |

After Cowles until the grind passed 7+ Hegman, then water was added:

| Water | 37.5 |
| --- | --- |

EXAMPLE 20

Preparation of a Pigmented Coating Formulation using Latex from Example 17

Paint Letdown:

| Material: | Weight (g): |
| --- | --- |
| Latex | Example 17 |
| Example 19 Grind | 137.02 |
| Example Latex | 216.0 |
| TEXANOL | 6.5 |
| FOAMASTER AP)Premix | 1.04 |
| FOAMASTER VF) | 1.56 |
| 5% Cobalt Hydrocure II) | 2.34 |

The above were mixed with stirring then the following were added:

| | |
|---|---:|
| RHOPLEX RM 2020 | 56.16 |
| (50% aqueous by weight) | |
| DI (deionized) Water | 39.0 |
| Ammonia | 0.8 |
| (28% aqueous by weight) | |
| RHEOVIS CR2 thickener | 24.26 |
| (60% aqueous by weight) | |
| Resulting pH: | 8.55 |
| Paint Viscosity (KU): | 88 |
| ICI Viscosity (P): | 2.09 |
| Brookfield Viscosity* (cP): | 5,760 |

*spindle 3 at 3 rpm

Paint viscosity (in Krebs Units) was measured after 24 hours using a Krebs-Stormer viscometer. The resulting paint, Example 20, was evaluated for gloss, color, scrub resistance, alkali resistance, blocking resistance, and print resistance. The results are shown in the following Tables 1–5.

TABLE 1

| | Gloss | Color | Scrub Days Dry | | BT/TF Wet Adhesion Days/Dry | | Alkali Resist 7D |
|---|---|---|---|---|---|---|---|
| Paint | 60/20 | L,a,b | 1D | 7D | 1D | 7D | Dry |
| 20 | 73/31 | 95.17, −0.39, 2.21 | 89 | 277 | 87/181 | 865/2311 | 6.5% |

TABLE 2

| | Blocking Resistance: Days (D) dry-Days (D) Face-To-Face (FTF) | | | | | |
|---|---|---|---|---|---|---|
| Paint | 1D-1D | 1D-7D | 2D-1D | 2D-7D | 7D-1D | 7D-7D |
| 20 | 4 | 3 | 4 | 4 | 5 | 4 |

TABLE 3

| | Blocking Resistance: Days (D) dry-30 Minutes FTF at 120° F. | | |
|---|---|---|---|
| Paint | 1D | 2D | 7D |
| 20 | 1 | 2 | 4 |

TABLE 4

| | Print Resistance: Days (D) dry-Days (D) Face-To-Face (FTF) | | | | | |
|---|---|---|---|---|---|---|
| Paint | 1D-1D | 1D-7D | 2D-1D | 2D-7D | 7D-1D | 7D-7D |
| 20 | 2 | 2 | 4 | 4 | 4 | 2 |

TABLE 5

| | Paint Resistance: Days (D) dry-30 Minutes FTF at 120° F. | | |
|---|---|---|---|
| Paint | 1D | 2D | 7D |
| 20 | 4 | 6 | 6 |

EXAMPLE 21

Preparation of a Small Particle Size, Core/Shell Acetoacetoxy-Containing Waterborne Polymer To a 3000 mL resin kettle equipped with a condenser, nitrogen purge, and subsurface feed tube were added 720 g of water, 39.2 g of HITENOL HS-20, 1.54 g of TERGITOL NP-40 (70%), 5.84 g of ammonium bicarbonate, 26.14 g of methyl methacrylate, 35.2 g of styrene, 26.4 g of 2-ethylhexyl acrylate, and 0.264 g of trimethylolpropane triacrylate. A nitrogen purge was begun, then the contents of the reactor brought up to 80° C. at 400 rpm. After reaching 80° C., an initiator solution composed of 6.16 g of ammonium persulfate dissolved in 34.84 g of water was added to the reactor. An initiator solution composed of 2.08 g of ammonium persulfate dissolved in 53.6 g of water was started at 0.336 g/min. Thirty minutes after the initiator feed was begun, an emulsion feed composed of 153.6 g of water, 15.72 g of AEROSOL 18, 15.72 g of TERGITOL NP-40 (70%), 110.4 g of methyl methacrylate, 148.7 g of styrene, 111.52 g of 2-ethylhexyl acrylate, and 1.12 g of trimethylolpropane triacrylate was begun at 5.24 g/min. After the first emulsion feed was completed, the feed lines were washed with 80 g of water, and the temperature held at 80° C. for 30 minutes. The reactor was then cooled to 65° C., and an initiator solution of 2.74 g of sodium formaldehyde sulfoxylate dissolved in 16 g of water, and 5.05 g of a catalyst solution composed of 0.5% iron (II) sulfate chelated with ethylenediamine tetracetic acid were added to the reactor. A second emulsion feed composed of 138.4 g of water, 9.72 g of AEROSOL 18, 9.98 g of TERGITOL NP-40 (70%), 191.90 g of styrene, 45.6 g of methyl methacrylate, 143.92 g of 2-ethylhexyl acrylate, 95.95 g of acetoacetoxyethyl methacrylate, and 4.72 g of the sodium 2-acrylamido-2-methylpropanesulfonate (50% in water) was fed at 5.24 g/min. A solution of 3.92 g of t-butylhydroperoxide dissolved in 32 g of water was fed into the reactor during the second emulsion feed at 0.14 g/min. After the t-butylhydroperoxide feed was completed, heating was continued for 30 minutes. The latex was then filtered through 100 mesh wire screen. Solids level, 44.9; amount of dried material (100 mesh screen), 1.5 g; particle size (Dw), 72 nm.

EXAMPLE 22

Preparation of a Small Particle Size, Core/Shell Amine-Containing Waterborne Polymer To a 400 mL resin kettle equipped with a condenser, nitrogen purge, and subsurface feed tube were added 900 g of water, 49 g of HITENOL HS-20, 1.93 g of TERGITOL NP-40 (70%), 7.3 g of sodium carbonate, 32.67 g of methyl methacrylate, 44 g of styrene, 33 g of 2-ethylhexyl acrylate, and 0.33 g of trimethylolpropane triacrylate. A nitrogen purge was begun, then the contents of the reactor brought up to 80° C. at 400 rpm. After reaching 80° C., an initiator solution composed of 7.70 g of sodium persulfate dissolved in 43.55 g of water was added to the reactor. An initiator solution composed of 2.61 g of sodium persulfate dissolved in 67 g of water was started at 0.42 g/min. Thirty minutes after the initiator feed was begun, an emulsion feed composed of 192 g of water, 19.65 g of AEROSOL 18, 19.65 g of TERGITOL NP-40 (70%), 138.01 g of methyl methacrylate, 185.88 g of styrene, 139.41 g of 2-ethylhexyl acrylate, and 1.394 g of trimethylolpropane triacrylate was begun at 6.56 g/min. After the first emulsion feed was completed, the feed lines were washed with 80 g of water, and the temperature held at 80° C. for 30 minutes. The reactor was then cooled to 65° C., and an initiator solution of 3.42 g of sodium formaldehyde sulfoxylate dissolved in 20 g of water, and 6.31 g of a catalyst solution composed of 0.5% iron (II) sulfate chelated with ethylenediamine tetracetic acid were added to the reactor. A second emulsion feed composed of 173 g of water, 12.15 g of AEROSOL 18, 12.48 g of TERGITOL NP-40 (70%), 239.88 g of styrene, 54.06 g of methyl methacrylate, 179.91 g of 2-ethylhexyl acrylate, 119.94 g of acetoacetoxyethyl methacrylate, and 11.81 g of the sodium 2-acrylamido-2-methylpropanesulfonate (50% in water) was fed at 6.56 g/min. A solution of 4.9 g of t-butylhydroperoxide dissolved in 40 g of water was fed into the reactor during the second emulsion feed at 0.14 g/min. After the t-butylhydroperoxide feed was completed, heating was continued for 30 minutes. The emulsion was cooled to less than 35° C., and 202.53 g of polyethylenimine (50%) were pumped in over 15 minutes. The latex was then filtered through 100 mesh wire screen. Solids level, 44.7; amount of dried material (100 mesh screen), 1.3 g; particle size (Dw), 56 nm; pH, 10.5.

EXAMPLE 23

Preparation of a Small Particle Size, Unstructured Amine-Containing Waterborne Polymer To a 3000 mL resin kettle equipped with a condenser, nitrogen purge, and subsurface feed tube were added 1115 g of water, 15.52 g of HITENOL HS-20, 2.55 g of TERGITOL NP-40 (70%), 3.5 g of sodium carbonate, 8.10 g of methyl methacrylate, 5.38 g of 2-ethylhexyl acrylate, and 4.43 g of acetoacetoxyethyl methacrylate. A nitrogen purge was begun, then the contents of the reactor brought up to 80° C. at 400 rpm. After reaching 80° C., an initiator charge composed of 2.30 g of sodium persulfate dissolved in 13.0 g of water was added to the reactor. An emulsion feed composed of 120 g of water, 6.55 g of AEROSOL 18, 10.22 g of TERGITOL NP-40 (70%), 66.36 g of methyl methacrylate, 170.73 g of 2-ethylhexyl acrylate, and 101.0 g of acetoacetoxyethyl methacrylate was begun at 8.38 g/min. Five minutes after the first emulsion feed was begun, an initiator solution composed of 1.3 g of sodium persulfate dissolved in 33.5 g of water was fed at 0.536 g/min. Five minutes after the monomer emulsion feed was completed, a post initiator solution of 3.125 g of sodium persulfate and 3.125 g of sodium metabisulfite g of sodium metabisulfite dissolved in 93.8 g of water was charged and heating continued for 30 minutes. The emulsion was cooled to 30° C., then 299.4 g of polyethylenimine (33.3% solids in water) was added to the reactor and stirring continued for 15 minutes. The latex was then filtered through 100 mesh wire screen. Solids level, 23.9; amount of dried material (100 mesh screen), 0.00 g; particle size, 53 nm. Glass transition onset/midpoint, −14° C./4° C. Infrared analysis of clear films cast over ZnSe showed absorptions at 1552 cm$^{-1}$ and 1597 cm$^{-1}$ which represent the formation of enamine moieties from the reaction between polyethylenimine and acetoacetoxy moieties.

EXAMPLES 24–35

Preparation of Small Particle Size, Unstructured Amine-Containing Waterborne Polymers The monomer compositions were the same as described in Example 23. The process was similar to that described in Example 23 except for solid levels adjustments, surfactant changes, levels of poly(ethylenimine) and process changes described in Table 6. Using the data from Table 6, FIG. 1 illustrates the relationship between polymer particle size, percent solids, and viscosity of these latexes. As can be seen from Table 6 and from FIG. 1, a latex according to the invention having a small polymer particle size of nearly 60 nm and a 50% solids level, still possesses a latex viscosity of less than 200 cps.

TABLE 6

Characterization of Examples 23–35

| Examples | Solids | Grams of H$_2$O in Reactor Charge | Recoverable Solids (g) | Particle Size (nm) | Viscosity, cps (60 rpm) | Grams of PEI (% Solids) | Tg, onset/ midpoint (° C.) |
|---|---|---|---|---|---|---|---|
| 23 | 23.9 | 1115 | 0.00 | 53 | 5.5 | 299.4 (33.3) | −14/4 |
| 24[a] | 24.1 | 1115 | 0.00 | 53 | 6.1 | 299.4 (33.3) | −13/3 |
| 25[b] | 24.1 | 1100 | 0.00 | 55 | 5.4 | 299.4 (33.3) | −7/8 |
| 26 | 31.3 | 650 | 0.00 | 59 | 9.5 | 299.4 (33.3) | −31.4 (calc'd) |
| 27 | 31.5 | 650 | 0.00 | 53 | 9.8 | 299.4 (33.3) | −16/−7 |
| 28 | 36.1 | 450 | 0.00 | 45 | 16.8 | 299.4 (33.3) | −18/−8 |
| 29 | 35.9 | 440 | 2.08 | 55 | 14.9 | 299.4 (33.3) | −18/−7 |
| 30 | 41.6 | 340 | 0.00 | 52 | 42.6 | 235.4 (42.5) | −17/−6 |
| 31 | 43.5 | 290 | 0.00 | 67 | 66.2 | 221.5 (45) | −16/−7 |
| 32 | 44.2 | 290 | 0.00 | 59 | 79.2 | 199.4 (50) | −17/−8 |
| 33 | 44.6 | 290 | 1.74 | 59 | 72.5 | 199.4 (50) | −18/−9 |
| 34 | 50.2 | 190 | 2.53 | 90 | — | 0[c] | −36 (calc'd) |
| 35 | 50.1 | 190 | 1.79 | 60 | 179.0 | 199.4 (50) | −31 (calc'd) |

[a]PEI was added with stirring into the latex at 60° C.
[b]Used 38.8 g of TREM LF-40 as the reactive surfactant instead of HITENOL HS-20
[c]Used 31.7 g of ammonium hydroxide solution (28% active in water) in place of PEI.

EXAMPLE 36

Preparation of a Small Particle Size, Unstructured Amine-Containing Waterborne Polymer To a 3000 mL resin kettle equipped with a condenser, nitrogen purge, and subsurface feed tube were added 1115 g of water, 15.52 g of HITENOL HS-20, 2.55 g of TERGITOL NP-40 (70%), 3.5 g of sodium carbonate, 8.98 g of styrene, 3.62 g of 2-ethylhexyl acrylate, and 5.32 g of acetoacetoxyethyl methacrylate. A nitrogen purge was begun, then the contents of the reactor brought up to 80° C. at 400 rpm. After reaching 80° C., an initiator charge composed of 2.30 g of sodium persulfate dissolved in 13.0 of water was added to the reactor. An emulsion feed composed of 120 g of water, 9.94 g of AEROSOL 18, 10.22 g of TERGITOL NP-40 (70%), 170.39 g of styrene, 68.70 g of 2-ethylhexyl acrylate, and 101.0 g of acetoacetoxyethyl methacrylate was begun at 8.38 g/min. Five minutes after the first emulsion feed was begun, an initiator solution composed of 1.3 g of sodium persulfate dissolved in 33.5 g of water was fed at 0.536 g/min. Five minutes after the monomer emulsion feed was completed, a post initiator solution of 3.125 g of sodium persulfate and 3.125 g of sodium metabisulfite dissolved in 93.8 g of water was charged and heating continued for 30 minutes. The emulsion was cooled to 30° C., then 299.4 g of polyethylenimine (33.3% solids in water) was added to the reactor and stirring continued for 15 minutes. The latex was then filtered through 100 mesh wire screen. Solids level, 23.8; amount of dried material (100 mesh screen), 0.00 g; particle size, 49 nm. Infrared analysis of clear films cast over ZnSe showed absorptions at 1553 $cm^{-1}$ and 1597 $cm^{-1}$ which represent the formation of enamine moieties from the reaction between polyethylenimine and acetoacetoxy moieties.

EXAMPLES 37–44

Preparation of a Small Particle Size, Unstructured Amine-Containing Waterborne Polymer The monomer compositions were the same as described in Example 36. The process was similar to that described in Example 36 except for solid levels adjustments, surfactant changes, levels of poly(ethylenimine) and process changes described in Table 7.

TABLE 7

Characterization of Examples 36–44

| Examples | Solids | Grams of $H_2O$ in Reactor Charge | Recoverable Solids (g) | Particle Size (nm) | Viscosity, cps (60 rpm) | Grams of PEI (% Solids) |
|---|---|---|---|---|---|---|
| 36 | 23.9 | 1115 | 0.00 | 49 | 5.9 | 299.4 (33.3) |
| 37[a] | 23.8 | 1100 | 48.6 | 48 | 5.7 | 299.4 (33.3) |
| 38 | 30.8 | 650 | 0.37 | 62 | 9.9 | 299.4 (33.3) |
| 39 | 31.3 | 650 | 0.45 | 54 | 10.2 | 299.4 (33.3) |
| 40 | 37.0 | 340 | 0.28 | 56 | 30.9 | 262.4 (38.0) |
| 41 | 41.8 | 340 | 0.00 | 55 | 30.0 | 235.4 (42.5) |
| 42 | 43.7 | 290 | 0.00 | 58 | 46.6 | 221.5 (45) |
| 43 | 45.0 | 290 | <5 | 54.5 | 41.3 | 199.4 (50) |
| 44 | 43.7 | 290 | 4.8 | 51.5 | 89.7 | 0.00 |

[a]. Used 38.8 g of TREM LF-40 as the reactive surfactant instead of HITENOL HS-20.

EXAMPLE 45

Film Properties

Clear films were prepared using the latexes of Examples 24, 25, 27, and 28. Clear films were cast on release paper and cured ambiently for specified periods of time in the CTH room or cured for 30 minutes in a forced air oven at 120° C. The film tensile properties, film gel fraction (FGF), film swell ratio (FSR), and volatile content were determined. The results are shown in Table 8 below. The changes observed in ambient versus thermal (120° C.) curving demonstrate the curing behavior of the films.

TABLE 8

| | | Film (in acetone) | | Tensile Properties | | | | | |
|---|---|---|---|---|---|---|---|---|---|
| | | | | Ultimate | Ultimate | | Initial | Yield | Yield |
| Example | Drying Conditions | Swell Ratio | Gel Fraction | Breaking Load (psi) | Elongation: (%) | Work: (in · lb/in$^3$) | Modulus (ksi) | Breaking Load (psi) | Elongation: (%) |
| 24 | 8 days CTH | 3.7 | 83.5 | 1422 | 145.1 | 1242 | 3.4 | 309 | 17.9 |
| | 120° C., 30" | 2.9 | 93.4 | 683 | 168.6 | 767 | 4.3 | 161 | 11.2 |
| 25 | 8 days, CTH | 3.9 | 82.9 | 1496 | 129.5 | 1012 | 2.8 | 302 | 20.5 |
| | 120° C., 30" | 2.7 | 94.6 | 496 | 110.2 | 328 | 3.0 | 120 | 11.5 |
| 27 | 8 days, CTH | 3.2 | 88.7 | 1708 | 117.4 | 867 | 3.1 | 298 | 20.7 |
| | 120° C., 30" | 3.0 | 93.5 | 1153 | 102.4 | 590 | 4.5 | 249 | 14.3 |
| 28 | 8 days, CTH | 3.4 | 85.0 | 453 | 35.8 | 104 | 4.3 | 186 | 10.6 |
| | 120° C., 30" | 3.1 | 93.4 | 811 | 87.7 | 341 | 2.5 | 169 | 15.4 |

EXAMPLE 46

Residual Monomer Reduction

Three AAEM acetoacetoxy-based latexes having average residual level of ethyl acrylate was 50 ppm, and the amount of acetone (from hydrolysis of AAEM during polymerization) detected in the latex was 0.13%. Samples were prepared by blending each latex with a PPAE latex (3 parts latex to 1 part PPAE latex). The PPAE latex contained no ethyl acrylate as a base monomer and 0.08% acetone. After one week, the amount of detectable ethyl acrylate and acetone in all three samples was 2 ppm (theoretical: 37 ppm) and the amount of detectable acetone, 0.006% (theoretical 0.11%), respectively. The results demonstrate the ability of a PPAE according to the invention to scavenge or remove carbonyl-based compounds, such as acrylates, ketones, aldehydes, acrylonitrile, and vinyl acetate from complex compositions such as waterborne polymer latexes.

EXAMPLE 47 (COMPARATIVE)

Preparation of latex described in European Patent Application, 0 634 425 A1, Example 10 Latex B (Composition: Core: Butyl Acrylate/Styrene/Divinyl Benzene/Methacrylic Acid; 3/91.6/4.4/1 Shell: Butyl Acrylate/Acetoacetoxyethyl Methacrylate/Methacrylic Acid; 83/10/7)

To a 1000 mL resin kettle equipped with a condenser, nitrogen purge, and subsurface feed tube were added 382.5 g of water, 0.072 g of AEROSOL OT (75%), 0.1 g of TERGITOL 15-S-40 (70%), 0.1761 g of methacrylic acid, 16.13 g of styrene, 0.528 g of butyl acrylate, and 0.775 g of divinyl benzene. A nitrogen purge was begun, then the contents of the reactor brought up to 80° C. at 400 rpm. After reaching 80° C., an initiator solution composed of 2.26 g of sodium persulfate dissolved in 13.06 g of water was added to the reactor. An emulsion feed composed of 57.45 g of water, 0.765 g of AEROSOL OT (75%), 0.765 g of TERGITOL 15-S-40 (70%), 1.55 g of methacrylic acid, 141.8 g of styrene, 4.64 g of butyl acrylate, and 6.81 g of divinyl benzene was begun at 2 g/min. Five minutes after the first emulsion feed was begun, an initiator solution composed of 1.278 g of sodium persulfate dissolved in 32.7 g of water was fed at 0.466 g/min. Thirty minutes after the first emulsion feed was completed, the reactor was cooled to 75° C., and a second feed composed of 0.21 g of AEROSOL OT (75%), 0.21 g of TERGITOL 15-S-40 (70%), 149.32 g of butyl acrylate, 17.99 g of acetoacetoxyethyl methacrylate, and 12.59 of the methacrylic acid was fed at 2.0 g/min. Five minutes after the last feed, the reactor was cooled to 65° C., and 0.6 g of a 0.5% Fe(II) sulfate solution complexed with EDTA, and 0.39 g of isoascorbic acid dissolved in 6 g of water were charged to the reactor. An feed solution prepared from 0.288 g of t-butylhydroperoxide (70%) dissolved in 6 g of water was then fed into the reactor over 30 minutes. After the initiator feed, heating was continued for 30 minutes, then the emulsion was cooled. The latex was then filtered through 100 mesh wire screen. Solids level, 45%.

EXAMPLE 48 (COMPARATIVE)

Attempted Functionalization of Latex from Example 47 with Polyethylenimine using the process described in Example 10, Latex B, European Patent Application, 0 634 425 A1

To 104 g of the latex from Example 46 was successively added while stirring the latex at room temperature 8.93 g of butyl CELLOSOLVE, (available from Union Carbide, Houston, Tex.), 2.98 g of butyl CARBITOL (available from Union Carbide, Houston, Tex.), and 0.37 g of polyethylenimine (PEI, 50% in water). The latex began to coagulate. After adding a total of 0.97 g of polyethylenimine (PEI, 50% in water), the latex had completely coagulated forming a solid mass.

TABLE 9

| PEI (50% solution), g | PEI (dry material), g | Moles of Acetoacetoxy Moieties per 104 g of latex | Active Moles of N-H Moieties from PEI | Mole Ratio of N-H per Acetoacetoxy |
|---|---|---|---|---|
| 0.37 | 0.185 | 0.011 | 0.0043 | 0.39 |
| 0.97 | 0.485 | 0.011 | 0.0011 | 1.0 |

EXAMPLE 49

Preparation of a Small Particle Size, Core/Shell Enamine-Containing Waterborne Polymer To a 3000 mL resin kettle equipped with a condenser, nitrogen purge, and subsurface feed tube were added 900.5 g of water, 49.0 g of HITENOL HS-20, 1.35 g of TERGITOL 15-S-40, 7.3 g of sodium carbonate, 31.9 g of methyl methacrylate, 44 g of styrene, 33 g of 2-ethylhexyl acrylate, and 1.1 g of trimethylolpropane triacrylate. A nitrogen purge was begun, then the contents of the reactor brought up to 80° C. at 400 rpm. After reaching 80° C., an initiator charge composed of 7.54 g of sodium persulfate dissolved in 43.6 g of water was added to the reactor. An emulsion feed composed of 198 g of water, 19.65 g of AEROSOL 18, 13.8 g of TERGITOL 15-S-40, 134.8 g of methyl methacrylate, 185.9 g of styrene, 139.4 g of 2-ethylhexyl acrylate, and 4.6 g of trimethylolpropane triacrylate was begun at 8.38 g/min. Five minutes after the first emulsion feed was begun, an initiator solution composed of 4.26 g of sodium persulfate dissolved in 109 g of water was fed at 0.466 g/min. After the first emulsion feed was completed, a second emulsion feed composed of 173 g of water, 12.15 g of AEROSOL 18, 8.7 g of TERGITOL 15-S-40, 239.4 g of styrene, 54.1 g of methyl methacrylate, 179.9 g of 2-ethylhexyl acrylate, 119.9 g of acetoacetoxyethyl methacrylate, and 11.8 g of the sodium 2-acrylamido-2-methylpropanesulfonate (50% in water) was fed at 8.38 g/min. Five minutes after the last feed, an initiator solution of 0.95 g of t-butyl hydroperoxide (70%), 1.34 g of isoascorbic acid dissolved in 20 g of water, and 2 g of 0.5% iron(II) sulfate.7 $H_2O$ (chelated with EDTA) was charged and heating continued for 30 minutes. The emulsion was cooled, and 35.8 g of ammonium hydroxide (28%) were pumped in over 15 minutes. The latex was then filtered through 100 mesh wire screen. Solids level, 43.5; amount of dried material (100 mesh screen), 0.94 g; particle size (Dw), 60 nm. Infrared analysis of clear films cast over ZnSe showed an absorption at 1565 $cm^{-1}$ which represents an enamine moiety.

EXAMPLE 50

Preparation of Low Gloss Formulated Coatings

| Material: | Formula 50A Weight: (g) | Formula 50B Weight (g): |
|---|---|---|
| GRIND: | | |
| DI Water | 28.0 | 28.0 |
| TAMOL 1124 | 2.6 | 2.6 |
| TRITON CF-10 | 1.3 | 1.3 |
| FOAMASTER AP | 1.3 | 1.3 |
| DOWICIL 75 | 0.5 | 0.5 |
| Mix well then add under agitation: | | |
| TI-PURE R-900 | 99.0 | 99.0 |
| OmyaCarb UF | 31.0 | 31.0 |
| Cowles until the grind passes 6 Hegman, then add: | | |
| DI Water | 15.5 | 15.5 |
| LETDOWN: | | |
| Grind (above) | 179.2 | 179.2 |
| Emulsion: Example 48 | 231.0 | 231.0 |
| Premix*: | | |
| *Foamaster AP | 3.4 | 3.4 |
| *Foamaster VF | 1.3 | 1.3 |
| *Aerosol OT-75 | 0.4 | 0.4 |
| *Eastman EB | 4.8 | 4.8 |
| *Eastman DB | 4.8 | 4.8 |
| Eastman EB | 2.0 | 4.0 |
| Eastman DB | 2.0 | 4.0 |
| DI Water | 9.5 | 4.0 |
| RM-2020 Solution | 54.0 | — |
| Tafigel PUR 45 Solution | — | 10.0 |
| Adjust viscosity to approx 85 KU with the following | | |
| CR2 Thickener | 44.7 | 62.0 |
| Final pH: | 8.8 | 8.8 |
| Final KU: | 82 | 79 |

The resulting paints, Examples 49A and 49B, were evaluated for gloss, wet adhesion, scrub resistance, blocking resistance, and print resistance. The results are shown in the following Table 10–14.

TABLE 10

| Paint | Gloss 60/20 | Scrub Average of 8, 15, & 21 Days Dry | BT/TF Wet Adhesion Days/Dry 1 D | 7 D |
|---|---|---|---|---|
| 49A | 41/7 | 648 | 1800/3000 | 3000/3000 |
| 49B | 17/3 | 695 | 3000/3000 | 3000/3000 |

TABLE 11

| | Blocking Resistance: Days (D) dry - Days (D) Face-To-Face (FTF) | | | | | | | |
|---|---|---|---|---|---|---|---|---|
| Paint | 1 D—1 D | 1 D–7 D | 2 D–1 D | 2 D–7 D | 7 D–1 D | 7 D—7 D | 21 D–1 D | 21 D–7 D |
| 49A | 9 | 7 | 7 | 9 | 9 | 9 | 10 | 10 |
| 49B | 8 | 6 | 9 | 6 | 6 | 7 | 10 | 9 |

TABLE 12

| Paint | Blocking Resistance: 21 Days (D) dry - 30 Minutes FTF at 120° F. |
|---|---|
| 49A | 7 |
| 49B | 10 |

TABLE 13

| | Print Resistance: Days (D) dry - Days (D) Face-To-Face (FTF) | | | | | | | |
|---|---|---|---|---|---|---|---|---|
| Paint | 1 D—1 D | 1 D–7 D | 2 D–1 D | 2 D–7 D | 7 D–1 D | 7 D—7 D | 21 D–1 D | 21 D–7 D |
| 49A | 0 | 0 | 1 | 1 | 7 | 4 | 8 | 7 |
| 20 | 6 | 2 | 3 | 3 | 7 | 3 | 6 | 3 |

TABLE 14

| Paint | Print Resistance: 21 Days (D) dry - 30 Minutes FTF at 120° F. |
|---|---|
| 49A | 8 |
| 49B | 10 |

EXAMPLE 51

Preparation of Small Core/shell Amine-functional Particle

To a 3000 mL resin kettle equipped with a condenser, nitrogen purge, and subsurface feed tube were added 720.4 g of water, 39.2 g of HITENOL HS-20, 1.59 g of TERGITOL NP-40 (70%), 25.5 g of methyl methacrylate, 35.2 g of styrene, 26.4 g of 2-ethylhexyl acrylate, 0.88 g of trimethylolpropane triacrylate and 5.84 g of sodium carbonate. A nitrogen purge was begun, then the contents of the reactor brought up to 80° C. at 400 rpm. After reaching 80° C., an initiator charge composed of 6.0 g of sodium persulfate dissolved in 34.84 g of water was added to the reactor. An emulsion feed composed of 197.2 g of water, 15.72 g of AEROSOL 18, 16.18 g of TERGITOL 15-S-40 (70% in water), 107.81 g of ethyl methacrylate, 148.70 g of styrene, 111.53 g of 2-ethylhexyl acrylate, and 3.72 of trimethylolpropane triacrylate was begun at 5.248/min. Five minutes after the first emulsion feed was begun, an initiator solution composed of 3.41 g of sodium persulfate dissolved in 87.2 g of water was fed at 0.336 g/min. After the first emulsion feed as completed, the feed line was washed with 20 g of water and the eaction was held at 80° C. for 30 minutes. Then a second emulsion feed composed of 135.2 g of water, 9.72 g of AEROSOL 18, 10.28 g of TERGITOL 15-S-40 (68% in water), 191.90 g of styrene, 43.25 g of methyl methacrylate, 143.93 g of 2-ethylhexyl acrylate, 95.95 g of acetoacetoxyethyl methacrylate, and 9.45 g of the sodium 2-acrylamido-2-methylpropanesulfonate (50% in water) was fed at 5.25/min. After the last feed, the reaction was held for 10 minutes at 80° C. then cooled to 65° C. over the next 20 minutes The reactor was then charged with a solution of 0.8 g of isoascorbic acid in 16 g water and 0.4 g of 0.5% iron (II) sulfate. Over the next 30 minutes, a solution of 0.58 g of t-butyl hydroperoxide (70% in water) in 16 g of water was fed into the reactor while heating continued. The emulsion was cooled, then 174.76 g of poly(ethylenimine) LUPASOL G35 (50% in water) was fed into the emulsion and the emulsion was filtered through 100 mesh wire screen. Dried solids collected on 100 mesh screen=1.24 g. Total solids level of 45% and pH was 10.4.

EXAMPLE 52

Addition of 10% Sulfuric Acid to Example 51 Latex to Make a Cationic System 16.92 g water was added to 15.0 g ice, the 3.58 g of concentrated sulfuric acid was added to the ice and water mixture to make a 10% olution of sulfuric acid. With stirring, the entire 10% sulfuric acid olution was added slowly to 50 g of the amine-functional latex of Example 51. The latex appeared to raise in viscosity very slightly upon initial contact but redispersed very nicely as the remainder of the sulfuric acid was added. Final pH=0.9, particle size 105 nm.

The claimed invention is:

1. A surfactant-containing acetoacetoxy-functional polymer comprising the reaction product of the free radical polymerization of a non-acid vinyl monomer having an acetoacetoxy-type functionality with at least one non-self-polymerizing, ethylenically-unsaturated surfactant monomer selected from the group consisting of a sodium alkyl allyl sulfosuccinate and a polyoxyethylene alkyl phenyl ether of formula (3), (4), or (5):

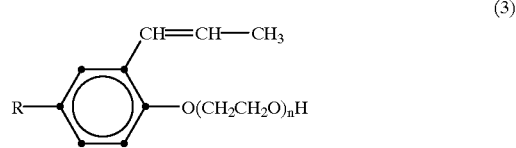

(3)

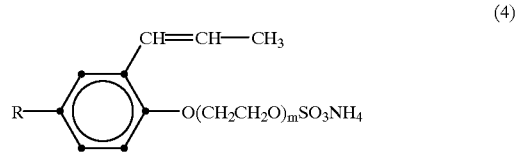

(4)

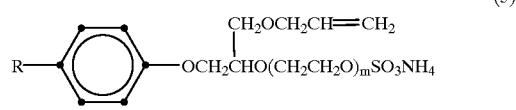

(5)

where R is nonyl or octyl, n ranges from 15 to 50, and m ranges from 15 to 40.

2. A polymer of claim 1, comprising about 1 to about 40 weight percent of the non-acid vinyl monomer having an acetoacetoxy-type functionality of Formula (1):

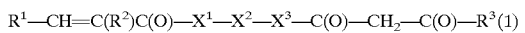

where $R^1$ is a hydrogen or halogen; $R^2$ is a hydrogen, halogen, $C_1$–$C_6$ alkylthio group, or $C_1$–$C_6$ alkyl group; $R^3$ is a $C_1$–$C_6$ alkyl group; $X^1$ and $X^3$ are independently O, S, or a group of the formula —N(R')—, in which R' is a $C_1$–$C_6$ alkyl group; $X^2$ is a $C_1$–$C_{12}$ alkylene group or $C_3$–$C_{12}$ cycloalkylene group;

about 0.05 to about 20 weight percent of the at least one non-self-polymerizing, ethylenically-unsaturated surfactant monomer; and about 75 to about 90 weight percent of a non-acid vinyl monomer.

3. A polymer of claim 2, wherein the monomer of Formula (1) is selected from the group consisting of acetoacetoxyethyl methacrylate; acetoacetoxyethyl acrylate; acetoacetoxy(methyl)ethyl acrylate; acetoacetoxypropyl acrylate; allyl acetoacetate; acetoacetamidoethyl (meth) acrylate; and acetoacetoxybutyl acrylate, and wherein the non-acid vinyl monomer is selected from the group consisting of methyl acrylate; methyl methacrylate; ethyl acrylate; ethyl methacrylate; butyl acrylate; butyl methacrylate; isobutyl acrylate; isobutyl methacrylate; ethylhexyl acrylate; 2-ethylhexyl methacrylate; octyl acrylate; octyl methacrylate; iso-octyl acrylate; iso-octyl methacrylate; trimethylolpropyl triacrylate; styrene; α-methyl styrene; glycidyl methacrylate; carbodiimide methacrylate; $C_1$–$C_{18}$ alkyl crotonates; di-n-butyl maleate; di-octylmaleate; allyl methacrylate; di-allyl maleate; di-allylmalonate; methoxybutenyl methacrylate; isobornyl methacrylate; hydroxybutenyl methacrylate; hydroxyethyl (meth)acrylate; hydroxypropyl (meth)acrylate; acrylonitrile; vinyl chloride; ethylene; vinyl ethylene carbonate; epoxy butene; 3,4-dihydroxybutene; hydroxyethyl (meth)acrylate; sodium 2-acrylamido-2-methylpropane sulfonate; methacrylamide; acrylamide; butyl acrylamide; ethyl acrylamide; vinyl (meth)acrylate; isopropenyl (meth)acrylate; cycloaliphaticepoxy (meth) acrylates; vinylformamide; 2,3-dihydrofuran a vinyl ester of Formula (2):

$$RCH=CH-O-C(O)-C(R)_3 \qquad (2)$$

wherein R is independently hydrogen or an alkyl group of up to 12 carbon atoms; t-butylaminoethyl methacrylate; dimethylaminoethyl methacrylate; diethylaminoethyl methacrylate; N,N-dimethylaminopropyl methacrylamide; 2-t-butylaminoethyl methacrylate; N,N-dimethylaminoethyl acrylate; N-(2-methacrylamidoethyl)ethylene urea; and N-(2-methacryloyloxyethyl)ethylene urea.

4. A polymer of claim 1, wherein the polymer is a structured particle having an average polymer particle size ranging from about 25 to about 500 nm.

5. A polymer of claim 1, wherein the polymer is an unstructured particle having an average polymer particle size ranging from about 25 to about 500 nm.

* * * * *